(12) United States Patent
Radecker et al.

(10) Patent No.: US 7,218,533 B2
(45) Date of Patent: May 15, 2007

(54) RESONANCE CONVERTER WITH VOLTAGE REGULATION AND METHOD OF DRIVING VARIABLE LOADS

(75) Inventors: Matthias Radecker, Duisburg (DE); Gerald Deboy, Bodensdorf (AT)

(73) Assignees: Infineon Technologies AG, Munich (DE); Fraunhofer-Gesellschaft zur Foerderungder Angewandten Forschung E.V., Munich (DE)

( * ) Notice: Subject to any disclaimer, the term of this patent is extended or adjusted under 35 U.S.C. 154(b) by 146 days.

(21) Appl. No.: 11/156,351

(22) Filed: Jun. 16, 2005

(65) Prior Publication Data

US 2005/0281061 A1  Dec. 22, 2005

Related U.S. Application Data

(63) Continuation of application No. PCT/EP03/14428, filed on Dec. 17, 2003.

(30) Foreign Application Priority Data

Dec. 17, 2002  (DE) ................. 102 59 088

(51) Int. Cl.
*H02M 3/335* (2006.01)
(52) U.S. Cl. .................. 363/21.02
(58) Field of Classification Search .......... 363/20, 363/21.01, 21.02, 21.03, 95, 131
See application file for complete search history.

(56) References Cited

U.S. PATENT DOCUMENTS

| | | | |
|---|---|---|---|
| 5,559,688 A * | 9/1996 | Pringle | 363/89 |
| 5,866,968 A | 2/1999 | Mech | |
| 6,013,969 A | 1/2000 | Noma et al. | |
| 6,052,300 A | 4/2000 | Bishop et al. | |
| 6,144,139 A | 11/2000 | Noma et al. | |
| 6,188,163 B1 | 2/2001 | Danov | |
| 6,239,558 B1 | 5/2001 | Fujimura et al. | |
| 6,268,681 B1 | 7/2001 | Yamaguchi et al. | |
| 6,310,786 B1 * | 10/2001 | Yasumura | 363/21.03 |
| 6,348,755 B1 | 2/2002 | Shimamura et al. | |
| 6,583,999 B1 * | 6/2003 | Spindler et al. | 363/98 |

(Continued)

FOREIGN PATENT DOCUMENTS

EP  0665600  8/1995

(Continued)

OTHER PUBLICATIONS

Lin, R.L., et al. *Inductor-less Piezoelectric Transformer Electronic Ballast for Linear Fluorescent Lamp.* APEC2001. Proceedings, vol. 2. Anaheim, California.

(Continued)

*Primary Examiner*—Adolf Berhane
(74) *Attorney, Agent, or Firm*—Michael A. Glenn; Glenn Patent Group

(57) ABSTRACT

In a resonance converter for driving variable loads at first an input signal provided by a switch controlled by control means is converted to an output signal by a transformer. The transformer is dimensioned and connected such that a downward transformation ratio between input signal and output signal is between 5:1 and 100:1 when providing nominal power to the variable load. The switching frequency of the switch is controlled on the basis of a phase shift between a switch current and a load current at variable load and/or variable input voltage, a quantity dependent on the input voltage, as well as a quantity dependent on the output voltage. The inventive resonance converter further enables driving variable loads efficiently with the aid of a transformer.

29 Claims, 11 Drawing Sheets

U.S. PATENT DOCUMENTS

| | | | |
|---|---|---|---|
| 6,587,358 B1 * | 7/2003 | Yasumura | 363/21.02 |
| 6,724,644 B2 * | 4/2004 | Loef | 363/89 |
| 2001/0035698 A1 | 11/2001 | Nakatsuka et al. | |

FOREIGN PATENT DOCUMENTS

| | | |
|---|---|---|
| EP | 0681759 | 11/1995 |
| EP | 0782374 | 7/1997 |
| EP | 1220580 | 7/2002 |

OTHER PUBLICATIONS

Lowbridge, S., et al. *Electronic Ballasts for Fluorescent Lamps Using BUL770/791 Transistors*.

Nerone, L. *Novel Self-Oscillating Class E Ballast for Compact Fluorescent Lamps*. IEEE Trans. on Power Electronics. vol. 16. No. 2. Mar. 2001.

Prieto, M.J., et al. *A Very Simple DC/DC Converter Using Piezo-electric Transformer*. Power Electronics Specialists Conference, 2001. Jun. 17-21, 2001. Vancouver, Canada.

Redl, R, et al. *Design of 1.5. MHz Regulated DC/DC Power Converter, in PCI/MOTOR-CON*. Sep. 1983.

Sokal, N., et al. *Class E—A New Class of High-efficiency Tuned Single-Ended Switching Power Amplifiers*. IEEE Journal of Solid-State Circuits. vol. SC-10, No. 3. Jun. 1975.

\* cited by examiner

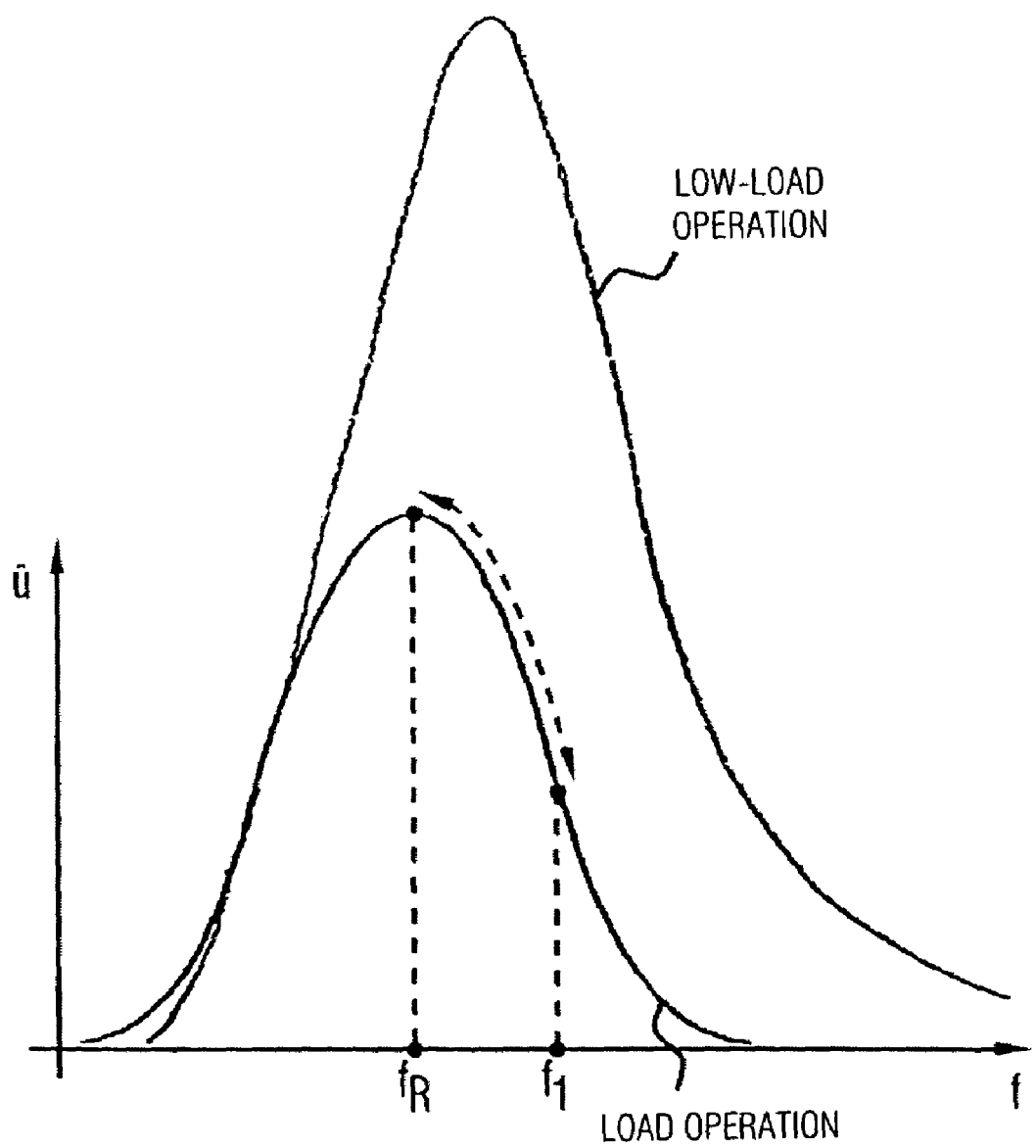

RESONANCE CONVERTER WITH VOLTAGE REGULATION AND METHOD OF DRIVING VARIABLE LOADS

CROSS-REFERENCE TO RELATED APPLICATION

This application is a continuation of co-pending International Application No. PCT/EP03/14428, filed Dec. 17, 2003, which designated the United States and was not published in English and is incorporated herein by reference in its entirety.

BACKGROUND OF THE INVENTION

1. Field of the Invention

The present invention relates to a switching power supply with regulation of the output voltage for driving variable ohmic-capacitive or ohmic-inductive loads, comprising a resonance circuit, an electromechanical energy converter, a switch, and control means.

2. Description of the Related Art

Switching power supplies with or without a resonance circuit mostly cannot do without inductive electromagnetic devices. For obtaining a low-loss switching operation, such circuits may only be operated up to a certain maximum frequency and only with resonant inductive elements or broadband transformers or inductances. Such components are volume-intensive and cause a significant cost proportion in the overall device.

For example, a self- or separate-excited half-bridge circuit is to be mentioned, which works with bipolar transistors, reverse diodes, a series resonance circuit, and inductive base feedback. An exemplary embodiment of such a half-bridge circuit is disclosed in the following document (1): S. Lowbridge, M. Maytum, K. Rutgers, "Electronic Ballasts for Fluorescent Lamps Using BUL 770/791 Transistors" (Texas Instruments, 1992). Here, the load circuit is predominantly embodied inductively, whereby low-loss switching in various load cases becomes possible. This circuit may also be classified as a class D amplifier. Even using minority-charge-free MOS (metal oxide semiconductor) transistors, it would have the disadvantage of capacitive sweep-out losses, because the switches have to be switched on under voltage unless an output-side resonance choke lets the voltage rise to about zero across the respective switch when switching on. Thus, zero voltage switching (ZVS), which distinguishes itself by a voltage across a power semiconductor being made zero before and during a switching operation when switching, is achieved by a sufficiently large (resonance) inductance at the load circuit.

Moreover, there are class E RF (radio frequency) amplifiers with only one switch and high efficiency. An embodiment of such a circuit is published in the following document (2): "N. O. Sokal, A. D. Sokal, "Class E—A New Class of High Efficiency Tuned Single-Ended Switching Power Amplifiers", (IEEE, Journal of Solid-State Circuits, Vol. SC-10, No. 3, June 1975). Such amplifiers are largely used as transmission amplifiers and are operated with an externally-generated clock at an optimum turn-on time. The turn-on time mostly is about half a period duration (D=0.5 corresponds to optimum). Here, D designates the relative (i.e. related to a period duration) turn-on time. This circuit also needs a resonance inductance in the load circuit, but achieves the zero voltage switching (ZVS) in parallel to a sufficiently large capacity. Whereas, in a half-bridge circuit, the parallel capacity to the switch is chosen as small as possible in order to achieve the zero voltage switching (ZVS) easily by resonance inductance, this parallel capacity is made as large as possible in the class E circuit mentioned, in order to keep the maximum voltage across the switch as small as possible during switch-off. If the capacity is, however, chosen too large, the voltage can no longer return to zero, and inadmissible turn-on losses occur.

When employing high-frequency piezoelectric transformers (piezo-transformers) or other energy converters with an electromechanical energy conversion, arbitrary transformation ratios may be realized, but these devices mostly do not offer predominantly inductive input behavior. Such electromechanical converters are mostly also very narrow-band and can only transfer sinusoidal vibrations with reference to their frequency behavior. A hard-switching converter topology is therefore less suited for operation thereof. Thus, the resonance operation has to be chosen, favorably also in a resonance converter topology. Since capacitive input and output behavior is substantially given by a piezoceramic material, such a converter may only replace the conventional inductances or transformers when, in the case of a desired inductive load circuit behavior, it is seen to that there is additional inductive shaping of the load circuit. In a half-bridge circuit, such inductive load circuit behavior is demanded in order to keep the switching losses small. As the simplest measure, an additional, yet small conventional conductance may be inserted into the load circuit. If the turn-on losses are small enough due to correspondingly low input voltage levels (e.g. small voltages up to 24 V), capacitive behavior of the electromagnetic converter in the half-bridge may also be acceptable.

Finally, also switching in a resonance case using a piezoelectric transformer may be configured so that the switching losses are minimized when a re-charge rime of the relatively large input capacities of the piezoelectric transformer is bridged by exactly meeting required control times by temporarily switching off both switches (dead times). For this, however, an accurately adjustable high-side and low-side driver circuit, which further mostly comprises an integrated circuit, is required. An embodiment of such a circuit is published in the following document (3): R. L. Lin, F. C. Lee, E. M. Baker, D. Y. Chen, "Inductor-less Piezoelectric Transformer Electronic Ballast for Linear Fluorescent Lamps", APEC2001, Anaheim, Calif., USA, Proceedings, Vol. 2, pp. 664–669.

In a class E resonance circuit according to document (2), the predominantly capacitive input behavior of a piezo-transformer is useful by the amount of the input capacity being able to be adapted to an electrically required value and thus not being spurious, as is the case in a half-bridge or another load circuit aimed at acting inductively. Such class E circuits with a piezoelectric transformer are already known from document (4), EP 0 665 600 B1.

Such circuits are, however, not employed for the case of a large input voltage and a small output voltage technically given in line voltage applications in document (4), but used for upward transformation of a smaller voltage to a larger one. This limitation to small input voltages has previously mainly been determined by the lacking availability of dynamically quick, high-blocking power switches, which can now be produced inexpensively, e.g. fieldstop IGBT (integrated gate bipolar transistor) up to 1700 V, or cool MOS transistors up to 800 V.

In small voltage applications, a class E circuit according to document (4) and according to document (2) is mostly employed in optimum operation with the relative turn-on time of D=0.5. In most cases, such a circuit requires an additional input-side parallel capacity in the case of the upward transformation, in case the input capacity of the piezoelectric transformer is not large enough. This is not given in a downward transformation case, where the input capacity of some embodiments of piezoelectric transformers may be too large.

Furthermore, there are single-transistor circuits with a piezo-transformer, which require a resonance inductance that does not, or not exclusively, act in a smoothing manner and thus has to be suited for a high frequency of about 50 to 200 kHz by a suitable choice of magnetic material and braided wire. An embodiment of such an arrangement is disclosed in document (5) U.S. Pat. No. 6,052,300. Furthermore, an input-side smoothing choke, as opposed to a smoothing or resonance inductance not acting on the input side, prevents a direct effect of high-frequency current vibrations on an input or on a smoothing capacitor, so that an input-side smoothing choke (referred to as choke inductance in the following) is to be preferred with respect to other arrangements of an inductance.

With reference to the control of circuits with a piezoelectric converter, the phase-locked loop (PLL) is a typical way of frequency tuning. In document (6), U.S. Pat. No. 5,855,968, a possibility is described to adjust the phase shift between output voltage and the driver signal of a circuit according to (4) so that a PLL circuit with a simple oscillator/driver IC can be realized. This regulating circuit for class E is particularly well suited for piezo-transformers with upward transformation properties, because the voltage maximum at the output of the transformer represents a prominent point for the nominal power at the same time. Owing to the low current stress in upward transformation, the frequency characteristic of the output voltage will almost correspond to an open case, so that the transformation ratio between open and nominal load changes little. In (6), substantially a phase-locked loop is given via the voltage courses between input and output, so that a maximum output voltage always arises when the right phase location (in this case about 90° or slightly less) is adjusted. This also applies for other topologies with strong upward transformation of the voltage, for example for the half-bridge circuit. For the case of the downward transformation, flattening of the transmission characteristic of the output voltage can be observed, since the secondary-side current stress clearly affects the voltage transmission ratio. In this case, in an inaccurate fixing of the nominal point, very different output powers arise in applications, such as power supplies, when an adjustment to the phase between the voltages would take place. When using the phase shift between the maximum of the output current and an input quantity as a basis for a regulation, the desired nominal power (nominal voltage) will hardly be adjustable by the exemplar scatterings of load (nominal current at nominal voltage) and piezo-transformer, independently of the topology. Thus, the regulation has to take place to a certain nominal value of the output current that is not necessarily the maximally transferred current. A basic solution for the adjustment of a PLL regulation according to this principle with exactly this disadvantage has become known according to (3). For the adjustment of the load current in (3), thus a very accurate regulating circuit has to be employed, which either requires a particular nominal value adjustment for each device in order to achieve the nominal point. Or the value of the output current is sampled accurately enough with great processing overhead. Phase regulation by sampling the zero crossings of output voltage and output current in a half-bridge circuit is again inaccurate owing to the scattering of re-charge times at the input of the piezo-transformer, so that evaluation of the amplitude of the output current is required there to adjust the nominal power.

When the output voltage of a current supply with changing load is to be regulated, solutions are known, which only enable little margin in the frequency position when using a conventional class E converter according to (2), as it is known from the following document (7): R. Redl, B. Molnar: Design of 1.5 MHz Regulated DC/DC Power Converter, in PCI/MOTOR-CON September 1983, Proceedings, pp. 74–87. A strong load increase particularly can no longer be reacted to by frequency change and the output voltage rises. With this, a consumer would be under too much strain. A pulsed operation of the class E amplifier may be a remedy. But with this there are disadvantages regarding voltage smoothing at the output when a supply as ripple-free as possible is demanded. Moreover, additional interferences as opposed to the line input arise, which develop by the constant upswing and turn-off of the amplifier and may require additional filtering effort. For those reasons, line current supplies with the conventional class E topology have not yet been able to gain acceptance, since they are inferior to half-bridge circuits or the most widely used flyback converter topology both in terms of regulation and with reference to the transmission behavior. In addition, they mostly require galvanic decoupling of the load circuit, which would require a further output transformer along with two chokes.

But if a piezo-transformer is inserted into the circuit according to document (6) as load circuit, the possibility arises to keep the output voltage constant over a small change in frequency. But in (6) no galvanic decoupling is achieved, although an auxiliary load circuit is employed for the generation of required phase control signals for guaranteeing a basic load. Thus, the configuration according to (6) is only suited with some reservations for current supplies with a regulated, galvanically decoupled input voltage. Since, in addition, in the case of an output rectification not shown in (6) only the AC voltage of the transformer output would be returned, additional control of the DC voltage is required. On the one hand, the flow voltage of the output rectifier may not be regarded as constant and is particularly dependent on the temperature. Furthermore, also a change of the flow voltage is to be expected at a change of load. Accordingly, a galvanic separation is required, for example via opto-coupling. If the signal is returned to the rectified output voltage in a galvanically separated manner, the additional necessity and possibility of frequency regulation via this signal results. This may, however, only take place with some reservations with the circuit shown in (6), because the phase-locked loop can only react with the average delay of half a period duration via a peak value rectification of the output voltage. With quick periodic changes in load, this also bears the risk of instability and a propensity to oscillation of the regulation. Thus, circuits according to (6) are not suited for precisely regulated DC voltage supplies with galvanic separation in spite of their simplicity. In particular, there is the danger that the output voltage breaks down, because the phase coupling is left.

According to document (10) ("A Very Simple DC/DC Converter Using Piezoelectric Transformer", M. J. Prieto et al., IEEE, 2001, pp. 1755 to 1760), current supplies with piezo-transformers are implemented in a half-bridge topology. Despite the small constructional size of the additional resonance inductance, which is switched to the input of the piezo-transformer, this inductance causes additional effort when it has to be designed for very high frequencies. This embodiment shows all the disadvantages of the half-bridge solution with piezo-transformers for line current controls. A high-volt driver IC as well as two fast switches (transistors) are required. Substantially, the regulation may only take place via the detection of the output voltage. The input voltage section is limited by the compliance with the ZVS condition in all load cases. For this reason a great value of the input-side charge capacitor has to be chosen to obtain small devices for resonance choke and piezo-transformer, wherein the input voltage variation is kept as small as possible. For a wide-range input with e.g. 85 V to 260 V, this solution is therefore not very suitable, because a large energy magnitude has to be stored in the input-side resonance choke, so that the aim of miniaturization is hardly achieved any longer.

SUMMARY OF THE INVENTION

It is an object of the present invention to provide a resonance converter with voltage regulation as well as a method of efficiently driving variable loads.

In accordance with a first aspect, the present invention provides a resonance converter for driving variable loads, having: a transformer with an input gate and an output gate for providing an output signal for driving the variable load; a switch for providing an input signal from a source to the input gate of the transformer; a controller for controlling a switching frequency of the switch; wherein the transformer is dimensioned and connected such that a downward transformation ratio between the input signal and the output signal is from 5:1 to 100:1 when providing nominal power to the variable load; and wherein the controller for controlling the switching frequency of the switch is designed on the basis of a phase shift between a switch current and a load current at variable load and/or variable output voltage.

In accordance with a second aspect, the present invention provides a method of driving variable loads by a resonance converter including a transformer with an input gate, wherein the transformer is dimensioned such that the voltage downward transformation ratio between the input signal and the output signal is from 5:1 to 100:1 when providing nominal power to the variable load, a switch and a controller, with the steps of: controlling a switching frequency of the switch by the controller on the basis of a phase shift between a switch current and a load current at variable load and/or variable input voltage, in order to apply an input signal to the input gate of the transformer and thereby generate an output signal for driving the variable load.

The present invention is based on the finding that a piezo-transformer for driving variable loads may be employed for the downward transformation case in a nominal load operation by using a switch for switching a voltage signal applicable to the piezo-transformer, the switching frequency of which is controlled on the basis of a phase shift between a switch current and a load current.

By the invention presented, a switching power supply or oscillator is defined, which is basically constructed like a class E amplifier with a piezoelectric transformer, but deviates downwardly in its mode of operation from an optimum given by D=0.5, so that the switch current only increases during the turn-on time, wherein D typically lies in an interval from 0.020 to 0.45, and a maximum of a switch voltage can be limited to about three times the value of the input voltage. D is here regarded as relative turn-on time of only the positive course of the switch current. In addition, a negative switch current course can and should occur by e.g. an anti-parallel diode to the switch in all operational cases, whereby the zero voltage switching (ZVS) remains guaranteed at all times.

This measure for sensible limitation of the switch voltage in line voltage applications is known from document (8), EP 0 681 759 B1, and also in the following document (9), L. R. Nerone, "Novel Self-Oscillating Class E Ballast for Compact Fluorescent Lamps", IEEE Trans. on Power Electronics, Vol. 16, No. 2, March 2001, pp. 175–183. Thus, a rectified line voltage of about 80 to 160 volts or 160 to 260 volts may be applied to an input of a class E amplifier, without exceeding a respective allowed voltage maximum of the switch (e.g. 600 V for 120 V AC voltage and 1200 V for 240 V AC voltage). Moreover, a piezoelectric transformer may be connected on the input side directly in parallel to a switch taking over the downward transformation to the load and guaranteeing a desired return of the switch voltage to zero across a defined load or input voltage range by its capacitive input behavior.

So as to require no additional reactive load circuit components in this circuit, a voltage transformation ratio of the piezoelectric transformer is chosen just so that the load impedance is matched, and an input capacity of the piezo-transformer is chosen so that it can store the required reactive power proportion in a resonant manner, so that neither the switch voltage is exceeded nor the voltage return to zero takes place. As opposed to the circuit according to document (4), the external capacity shown there in parallel to the switch becomes superfluous, because the input capacity of the piezoelectric transformer may be chosen large enough for a line voltage application, whereas its value is less well achieved by a piezoelectric transformer in small voltage applications and is possibly too small.

Furthermore, the inventive circuit only requires a low-side driver for line voltage applications compared with half-bridge circuits and thus comprises reasonable control effort. Thereby, the control effort for the entire circuit simplifies and is comparable with a control effort of a hard-switching DC/DC converter (flyback or boost arrangement).

Moreover, the switch only comes into reverse operation for a short time and comparable to the effect of a current source and therefore works in a very low-loss manner, in particular when using MOS transistors, but also when using IGBTs with a reverse diode even at high frequencies up to over 100 kHz.

Compared to (10), the topology is also capable of providing enough power to the load also at small input voltages by enough energy being stored in the input choke on the one hand. This energy is, however, not to be re-stored resonantly, so that the input choke may be kept small and low-loss despite its comparatively large inductance value. At the same time, it takes over all RF filter properties that have to be achieved by the resonance choke in the circuit according to (10). Furthermore, deviating from (10), a piezo-transformer with a small input capacity is used. Thereby, also with small input voltage and/or greater load, the ZVS may be achieved by the current circulating in the resonance circuit of the piezo-transformer resonantly discharging the input capacity in all cases. The input choke may be chosen small enough to assist this effect by decaying input current during the switch-off. If the input capacity of the piezo-transformer were made drastically smaller in the circuit according to (10), the resonance choke connected upstream thereto would have to be made equally larger. Thereby, additional losses or additional volume of the resonance choke arise in this circuit, which is not the case in the present invention.

The present invention enables, within certain boundaries, variable loads to be driven in a low-loss manner and with simple control effort at high frequencies, wherein there is only a minimum circuit overhead, including for example a switch (MOSFET or IGBT with a reverse diode), an input direct current choke (choke inductance), and an electromechanical energy converter (piezoelectric transformer). Here, a rectified line voltage with certain variations of the input voltage may be used just as well as a constant input DC voltage. The converter (resonance converter) generates an almost sinusoidal output voltage owing to the high quality of the electromechanical transformer, whereby the crest factor in downstream ohmic loads may be kept sufficiently small. In an operation of current supplies with balancing rectification, the sinusoidal output voltage leads to uniform stress of the valves. In a conventional circuit, as it is for example disclosed in document (2), this is only possible with a high load circuit quality, which would again entail increased current density stress of a decoupled capacity, as well as a switch parallel capacity. The circuit used in this way works in an overall low-loss manner, and the maximum frequency usable is substantially limited only by the dynamic losses of the switch. A fieldstop IGBT is very well suited for this application by its short tail time and load-reduced switch-off.

Thus, in the invention, few inexpensive devices are combined so that they meet the technical requirements of the downward transformation from rectified line voltage for typical small voltages for current supplies and chargers. At the same time, the electromagnetic converter (piezo-transformer) meets the demand of the upward transformation in a load-free state so that an inexpensive indication of the load-free state is possible, for example, via a glow discharge. In a state of the glow discharge, such a lamp represents a very high resistance. When the voltage breaks down due to stress, no glow discharge can be observed any more.

Furthermore, by the utilization of a load-dependent phase shift between a load current and a switch current, such a nominal load point is adjusted so that it can be regulated via a phase-locked loop (PLL). With sufficient bandwidth of a piezoelectric transformer, a simple integrated control circuit may be used here. The detection of the input or the output voltage is at first not required here for the adjustment of the working point, since the parameter dependence of the phase shift is small enough to roughly adjust the output power solely via a target value adjustment of the phase shift. Also, the amplitude of the output current does not have to be sampled for the purpose of approximate power adjustment, since, due to a change of the transformation ratio at a change in load, the nominal power may be mapped accurately enough to the phase shift of the current zero crossings of the switch and load currents. For the regulation of the output voltage, the returned signal of the output voltage may be used to adjust a working point more accurately and thus achieve accurate regulation, which comprises no instability. The output voltage signal is only used to change the phase shift between the switch and load currents within admissible boundaries and with admissible velocity in order to adjust the required output voltage. With this, it is achieved that quick robust regulation via the phase shift of the switch and load currents immediately balances potential input voltage or load changes without changing the energy content of the converter so strongly that instability arises. The exact regulation of the output voltage then takes place via a signal with a defined time constant, which changes the target value of the phase shift. With this, the regulation is largely orientated at the stability criteria of the topology used, which has been set forth in M. Radecker: "Effiziente Berechnung und Entwicklung energieübertragender Systeme" ("Efficient calculation and development of energy-transferring systems"), Technische Universitat Chemnitz (Technical University Chemnitz), Dissertation (doctoral thesis), May 12, 2000, part I, chapter 2.4 and part II, chapter 3.3.3, (to be found on www.dissertation.de under Leistungelektronik (power electronics) or Elektrotechnik (electrical engineering)).

BRIEF DESCRIPTION OF THE DRAWINGS

These and other objects and features of the present invention will become clear from the following description taken in conjunction with the accompanying drawings, in which:

FIG. 3a is a frequency-dependent voltage transfer function of a piezoelectric transformer in low-load operation and in load operation;

DESCRIPTION OF THE PREFERRED EMBODIMENTS

Figure 1:
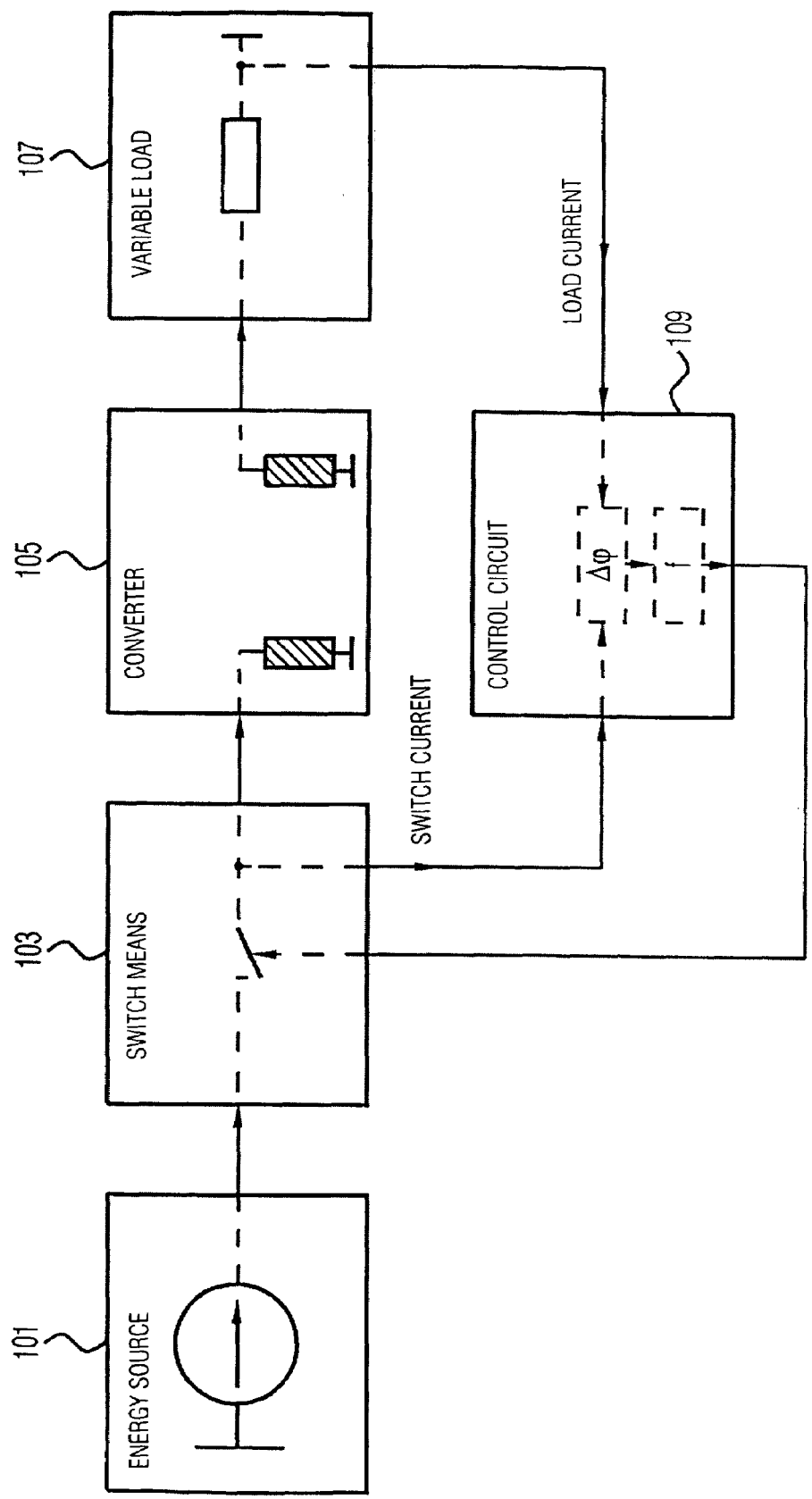
FIG. 1 is a rough block circuit diagram showing a principle construction of a resonant converter according to the invention.

In FIG. 1 a rough illustration of an inventive resonance converter is shown, which includes a source 101, a switch 103, a piezo-transformer 105, a variable load 107, as well as control means 109. A voltage provided by the source 101 or a current provided thereby is switched by means of the switch 103 at a switching frequency, whereby an input signal is present at the piezo-transformer 105, which is converted to an output signal having a frequency dependent on the switching frequency of the switch 103. This output signal serves for driving a load 107, the load characteristic of which is variable. The switching frequency with which the switch 103 is switched is controlled by the control means 109 on the basis of a phase shift between the current through the switch 103 and the load current through the load 107. This phase shift may be determined from several signals, which may for example be tapped before and after the piezo-transformer 105 as well as before or after the switch 107.

Figure 2:
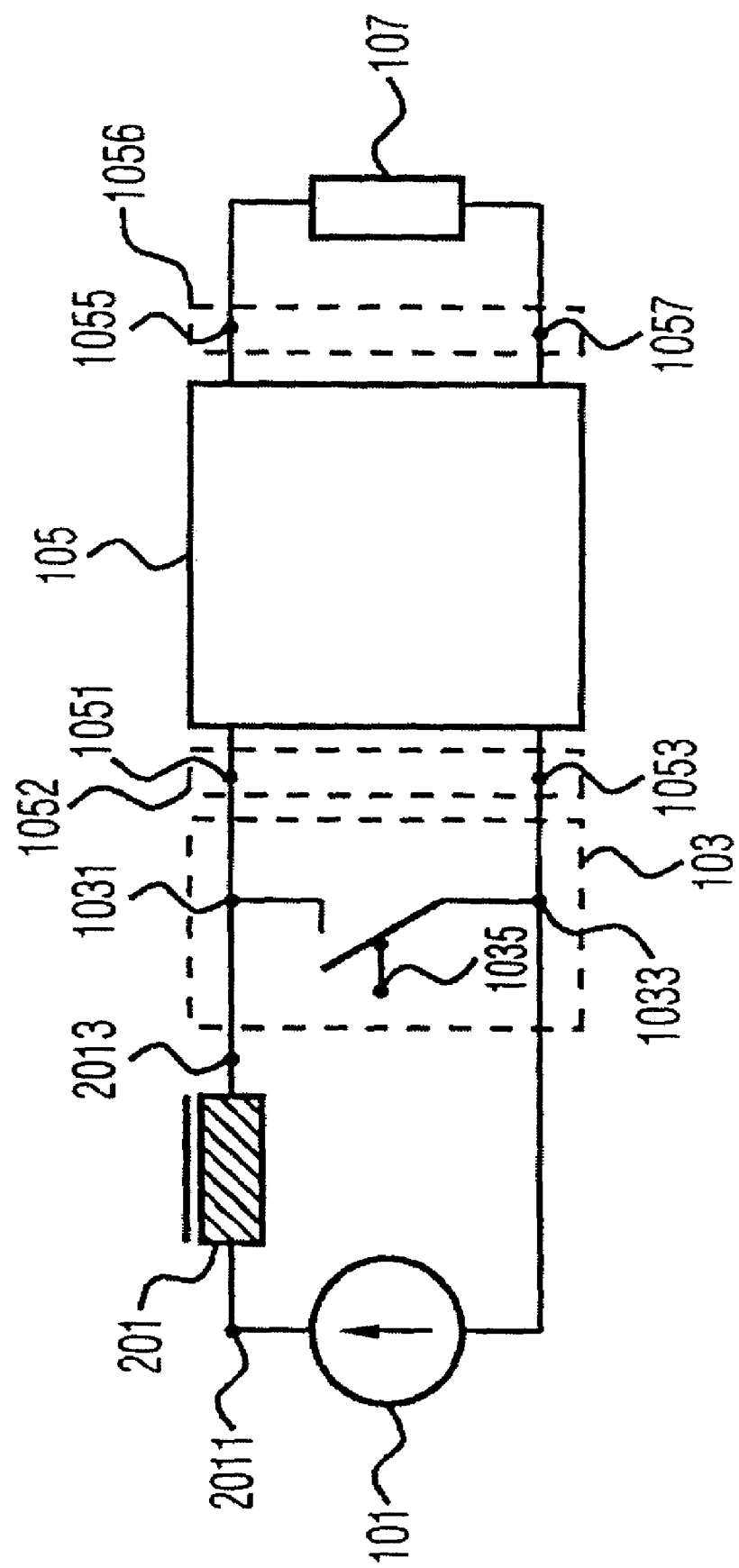
FIG. 2 is a circuit diagram of a resonance converter, wherein a control means for controlling the switching frequency of the switch is not illustrated.

FIG. 2 shows an embodiment of a resonance converter, with control means for controlling the switching frequency not being illustrated. The source 101 is coupled to a first terminal 2011 of an input choke 201. A second terminal 2013 of the input choke 201 is coupled to a first input 1031 of the switch 103. The first input 1031 of the switch 103 is coupled to a first terminal 1051 of an input gate 1052 of the piezo-transformer. The source 101 is further coupled to a second input 1033 of the switch 103, which is further coupled to a second terminal 1053 of the input gate 1052 of the piezo-transformer 105. The variable load 107 is connected between a first terminal 1055 of an output gate 1056 of the piezo-transformer and a second terminal 1057 of the output gate 1056. The switch 103 further comprises a control input 1035, to which a control signal may be applied, controlling the switching frequency of the switch 103. In the following, the functioning of the resonance converter shown in FIG. 2 is described in greater detail.

From the source 101, which may be a DC voltage source, an about constant or also saw-tooth-shaped direct current is fed via the input choke 201. The switch 103 is operated with a relative turn-on time D and an operational frequency f, so that resonance of the converter 105 is achieved and an output signal, for example a voltage, drives the variable load 107, for example an ohmic-capacitive load.

Figure 3:
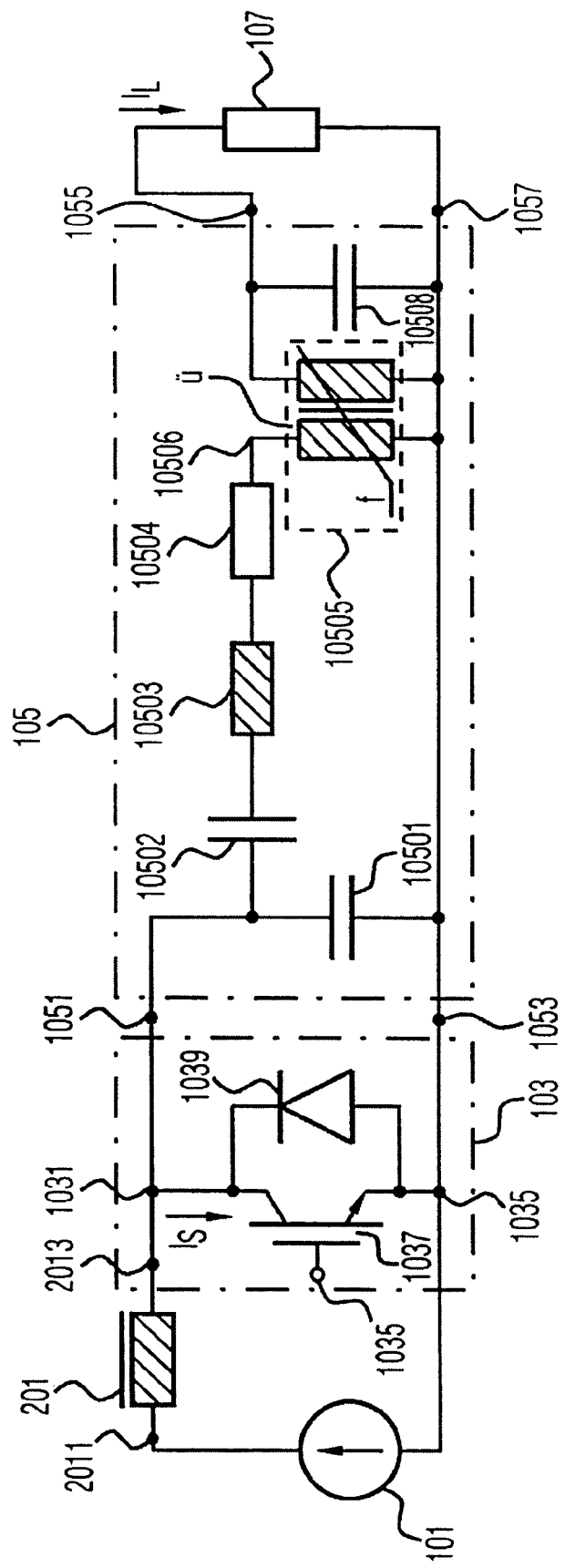
FIG. 3 is a detailed circuit diagram of the resonance converter of FIG. 2.

FIG. 3 shows a detailed circuit diagram of a resonance converter including a class E amplifier. The source 101 is at first coupled to the first terminal 2011 of the input choke 201. The second terminal of the choke inductance is coupled to the first input 1031 of the switch 103, with the first input 1031 further being coupled to the first terminal 1051 of the converter 105. The source 101 is also coupled to the second input 1033 of the switch 103, the second input 1033 further being coupled to the second terminal 1053 of the converter 105. The load 107 is arranged between the first terminal 1055 and the second terminal 1057 of the output gate of the converter 105. The switch 103 includes, in this embodiment, a voltage-controlled power switch 1037, the source or emitter of which is coupled to the first input 1031 of the switch and the drain or collector of which is coupled to the second input 1033 of the switch 103. The control input 1035 of the switch 103 is at the same time embodied as a gate of the voltage-controlled power switch 1037 in this embodiment. A diode 1039 is forward-biased between the second input 1033 and the first input 1031.

Moreover, in FIG. 3, a simplified equivalent circuit diagram of a piezo-transformer 105 is shown. The equivalent circuit diagram includes an input capacity 10501 switched between the first terminal 1051 and the second terminal 1053 of the input gate of the piezo-transformer 105 and thus arranged in parallel to the switch 103. Furthermore, the equivalent circuit diagram of the converter 105 includes a resonance circuit consisting of a serial circuit of a capacity 10502, an inductance 10503 as well as a resistor 10504. Furthermore, the equivalent circuit diagram of the converter 105 includes a transmitter arrangement 10505, the inverse voltage transmission ratio 1/ü (1/ü=effective input voltage to effective output voltage) of which is frequency-dependent and, according to the invention, between 5:1 and 100:1 in a nominal load operation, in which the reactive power proportion is smaller than the effective power proportion. The resonance circuit, which further distinguishes itself by high quality, consists of the capacity 10502, the inductance 10503, as well as the resistor 10504, and is connected between the first terminal 1051 of the converter 105 and a further terminal 10506 of a primary side of the transmitter arrangement 10505. An output capacity 10508 is arranged in parallel to a secondary side of the transmitter arrangement 10505.

The piezo-transformer 105 distinguishes itself by the transmission ratio ü being subject to change depending on the load 107. The load 107 connected between the terminals 1055 and 1057 is attached to the converter as load. The voltage-controlled power switch 1037 may for example be a quick IGBT (e.g. a fieldstop IGBT) or a MOS transistor (e.g. a cool MOS transistor), used together with an anti-parallel reverse diode. In the following, the functioning of the circuit illustrated in FIG. 3 will be explained.

If the voltage-controlled power switch 1037 is made conductive by applying a control signal to the control input 1035, a current flowing through the voltage-controlled power switch cannot rise sharply due to the input choke 201. Moreover, the input capacity 10501 of the converter 105 is discharged. If the voltage-controlled power switch 1035 is switched off, i.e. is reverse-biased, by applying a corresponding control signal, a voltage across the voltage-controlled power switch only grows slowly, because the input capacity 10501 is charging.

By the effect of the resonance circuit of the converter 105 in the settled state, a current reversal in the switch is achieved in spite of positive input current continuing to flow through the choke 201, whereby the capacity 10501 is also discharged again. The voltage across the switch 103 thus becomes zero again, and a negative current begins to flow through the switch.

The freewheeling diode 1039 has the task of routing or guiding a reverse current already before turn-on of the voltage-controlled power switch 1037. Here, a relative or an absolute turn-on time of the switch may remain almost constant because the diode does not have to be switched, but is subject to a current-guided mode of operation. As long as the diode routes the reverse current, the voltage-controlled power switch may thus be switched dead with reference to collector-emitter or drain-source, so that no turn-on losses occur. Such a current-controlled anti-parallel diode is not necessarily to be embodied as a fast diode, so that here also an inexpensive slow diode may be employed.

If the switch 103 is operated at a predetermined frequency, the resonance circuit, consisting of the capacity 10502, the inductance 10503, and the resistor 10504, is excited. If a resonance frequency of the resonance circuit is achieved with this, the converter 105 achieves a maximum voltage transmission ratio ü. In a use of a piezoelectric transformer, for example, a voltage transmission function may be described approximately by a Gaussian function (bell-shaped curve) at a defined input voltage 101 and a defined load 107 with reference to the frequency, as it is for example illustrated in FIG. 3a. At a resonance frequency $f_R$, the voltage transmission function in the load state achieves a maximum value. If the resonance frequency $f_R$ is exceeded, which corresponds to an over-resonant case, the voltage transmission function ü drops such that it follows a course of the Gaussian curve. For example at a frequency $f_1$ above the resonance frequency, the voltage transmission function ü has taken on a value that is clearly lower than the value of the voltage transmission function in the resonant case. If the frequency becomes lower again in the over-resonant operation, the voltage transmission ratio ü increases again.

If the voltage transmission function ü is chosen by suitable design of the electromechanical converter 105 to be so broad that a suitable decrease of the voltage transmission ratio occurs in a deviation from the resonant frequency, an increase of the voltage at the load may be counteracted. If the output voltage between the first terminal 1055 and the second terminal 1057 of the converter 105 increases, the piezoelectric transformer acts like a class E converter with a predominantly capacitive output load owing to its capacitive output due to the capacity 10508. Thereby, the overall power transmitted does not decrease to such an extent as if a constant ohmic resistor was operated as load at an equal frequency change. The overall power transmitted separates into the reactive power routed via the capacity 10508 and the effective power routed by the load 107. By a decrease of the load current, but a concurrent increase of the load voltage, the overall power transmitted can drop less strongly in a deviation from the resonance frequency than in a constant ohmic load with the same converter, because a capacitive reactive power, which is greater due to the greater output voltage, is routed via the capacity 10508.

Furthermore, in FIG. 3a, a transmission curve in a low-load operation is shown, in comparison with a transmission curve in load operation. When the variable load 107 changes to high-ohmic values, the output voltage may be kept constant in the over-resonant operation by adjusting a higher frequency, because the voltage transmission ratio also remains constant. For this, a piezo-transformer may be designed so that, with a change in load and a respective constant input AC voltage, the over-resonant branches of the transmission curve lie further apart than in the under-resonant case. This is shown in FIG. 3a for a low-load operation and a load operation. By the corresponding design of the piezo-transformer, a large frequency bandwidth in the over-resonant case may be attained, which is achieved by the choice of the inventive parameters of the piezo-transformer in a technically simple manner. The inventive parameters effective with reference thereto include an inventively small input capacity, an inventively large inverse voltage transmission ratio 1/ü, as well as a large output capacity of the piezo-transformer typically resulting therefrom.

Figure 4:
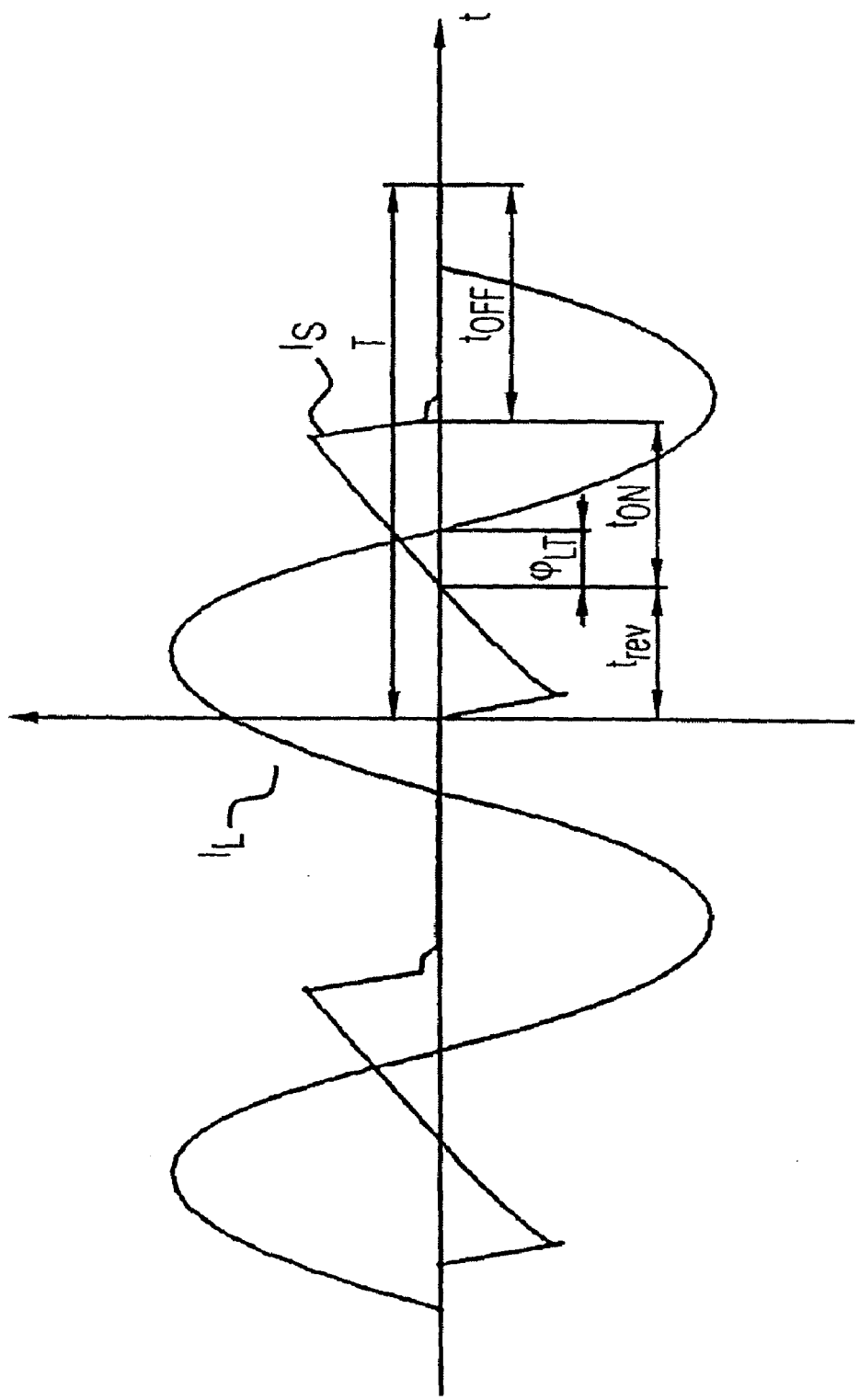
FIG. 4 shows qualitative characteristic curves of a switch current $I_S$ and a load current $I_L$.

FIG. 4 shows a diagram of the qualitative characteristic curves of the switch current $I_S$, load current $I_L$, and the phase angle $\phi_{LT}$ to be detected. Moreover, a period duration T, a switch-off time $t_{off}$, a reverse time $t_{rev}$, and a switch-on time $t_{on}$ are illustrated. The phase angle $\phi_{LT}$ determined by the zero crossings of the switch current $I_S$ and the load current $I_L$ is unequal to zero and relatively large in this exemplary diagram, because the load current $I_L$ has a greater capacitive proportion, which means a low-load operation.

If the inventive converter transitions to a load operation, the phase angle $\phi_{LT}$ may become smaller and smaller or even zero with increasing load 107. At the same time, the reverse time $t_{rev}$ becomes smaller and smaller and may also become almost zero, so that the negatively flowing reverse current through the diode 1039 disappears.

The frequency-dependent voltage transmission ratio of a piezoelectric transformer is utilized according to the invention in the embodiment shown in FIG. 3 to realize frequency-dependent power transmission depending on a variable load, as it has already been explained on the basis of FIG. 3a. This will be explained in detail in the following on the basis of the voltage transmission ratio of a piezoelectric transformer 105 illustrated in FIG. 5.

In most piezo-transformers, the resonance frequency in a load-free operation is higher than the optimum frequency under load (for example for maximum power or for maximum efficiency). In order to utilize this property for the control at a current supply, the resonance frequency of the electromechanical converter without load is realized under load above the resonance frequency, which is possible technically without any problems by suitable design of the piezoelectric transformer. Thereby it is avoided that the converter works at a frequency not corresponding to the aimed at translation in a nominal load operation, in which for example two or more adjacent resonance locations occur. Thus, the piezoelectric transformer will only comprise one resonance location, which is also found in an idle operation. The nominal frequency for the nominal load operation may about match the resonance frequency in a load-free or low-load state. Nevertheless, the output circuit always has to be capacitively connected externally in order to avoid overvoltages. Alternatively, an over-voltage detection may be inserted at the load, which immediately leads to switching off the converter with removed load. For switching on, the converter is first controlled with a frequency variable about the load-free resonance point, which is slowly lowered and is started sufficiently above the technically expected resonance frequency. After a detection of the decreasing reverse current in the switch and a sufficiently large load current, the presence of a load or at least an output-side load capacitor may be determined.

According to the invention, for control and regulation of the converter constructed in this way, a phase angle $\phi_{LT}$ between the load current and the switch current is evaluated, in order to realize for example an over-resonant regulation.

Figure 5:
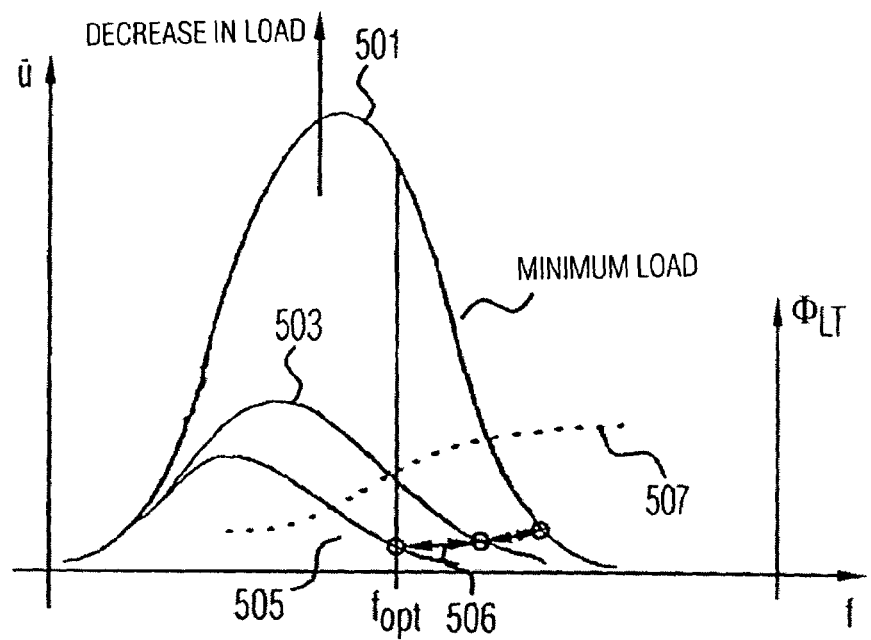
FIGS. 5 and 5a are courses of a phase angle $\phi_{LT}$ depending on a frequency as well as frequency-dependent voltage transfer functions depending on the output load and the input voltage.

In FIG. 5 also an exemplary course of the phase angle $\phi_{LT}$ for example at nominal load depending on the frequency (curve 507) together with the voltage transmission functions in a load-free state and in a load state (nominal load) is illustrated. It can be seen that the phase angle $\phi_{LT}$ constantly decreases until reaching a maximum power transmission, whereas it rises in the direction of a load-free operation. The load changes so that the nominal load or an even greater load occurs below $f_{OPT}$ (small voltage transmission ratio ü) and a smaller load above $f_{OPT}$ (large transmission ratio ü). By a defined frequency shift 506, the variable load may be balanced by the voltage at the output being kept constant, but the power changing corresponding to the load.

For control or regulation of the power given off to the load, therefore for example the over-resonant area above a frequency $f_{OPT}$ may be used. According to this, it is thus not necessary to detect a maximum value of the load current to control or regulate the converter. It is sufficient to sample the phase angle $\phi_{LT}$ between the switch and load currents and adjust it to a nominal value. At the same time, the signal is returned to the output voltage and changes the target value of the phase shift slightly to the respective magnitude required. If the frequency becomes smaller, the effective power transmission rises to its maximum at resonance frequency.

This results in the capacitive portion of the load current decreasing and the load current approximately flowing in phase with the load voltage as well as coming closer to the phase of the switch current. During switch-on, the switch current embodies about the input current of the piezo-transformer 105, which distributes itself to the load and to the output capacity 10508 of the converter 105 via the transformation ratio.

Figure 5A:
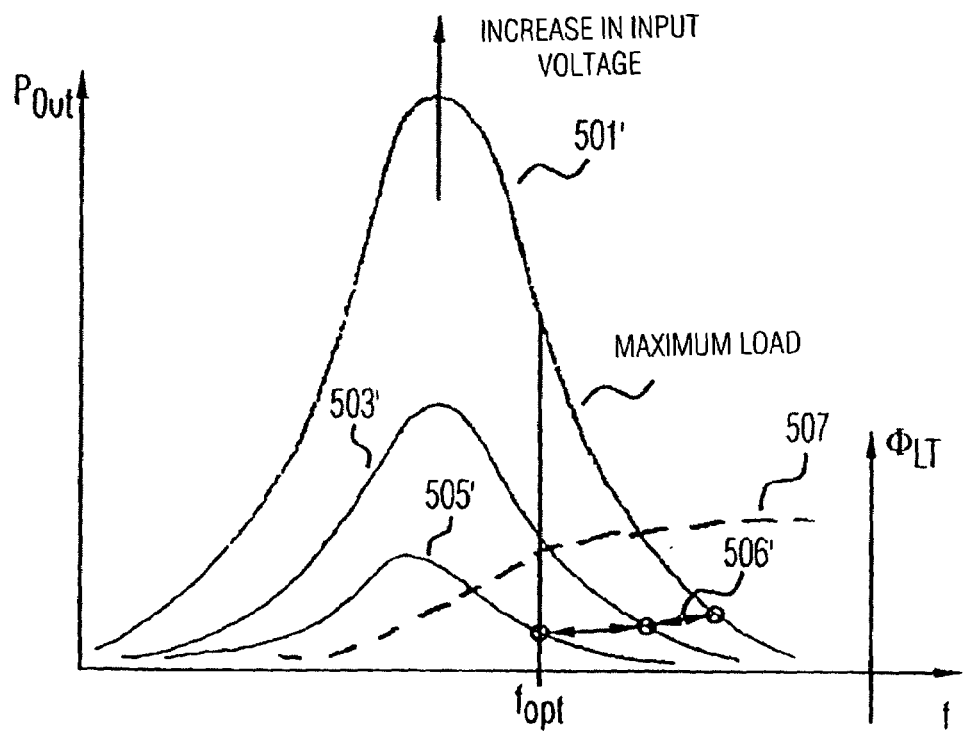

Furthermore, in FIG. 5a, a dependence of the output power transmission on the input voltage at constant output impedance is shown. The power $P_{out}$ may be increased by an increase of the input voltage from a minimum nominal voltage 505' via a higher input voltage 503' up to a maximum load characteristic curve 501'. Moreover, the output power can no longer be increased substantially, this being dependent on the volume used of the piezo-transformer. A smaller volume only enables a smaller maximum load. Attention is therefore to be paid that the piezo-transformer is at least designed for a greater load than the nominal load, so that the inventive regulating circuit according to FIG. 8 remains functional beyond the nominal load.

As can also be taken from FIG. 5a, the frequency $f_{OPT}$ at nominal load may lie so far from the resonance point of the curve 505' for the smallest nominal input voltage that an overload operation in the over-resonant operation is possible, so that a short-time overload may be reacted to with a further frequency decrease within a regulation functioning in an over-resonant manner.

Figure 6:
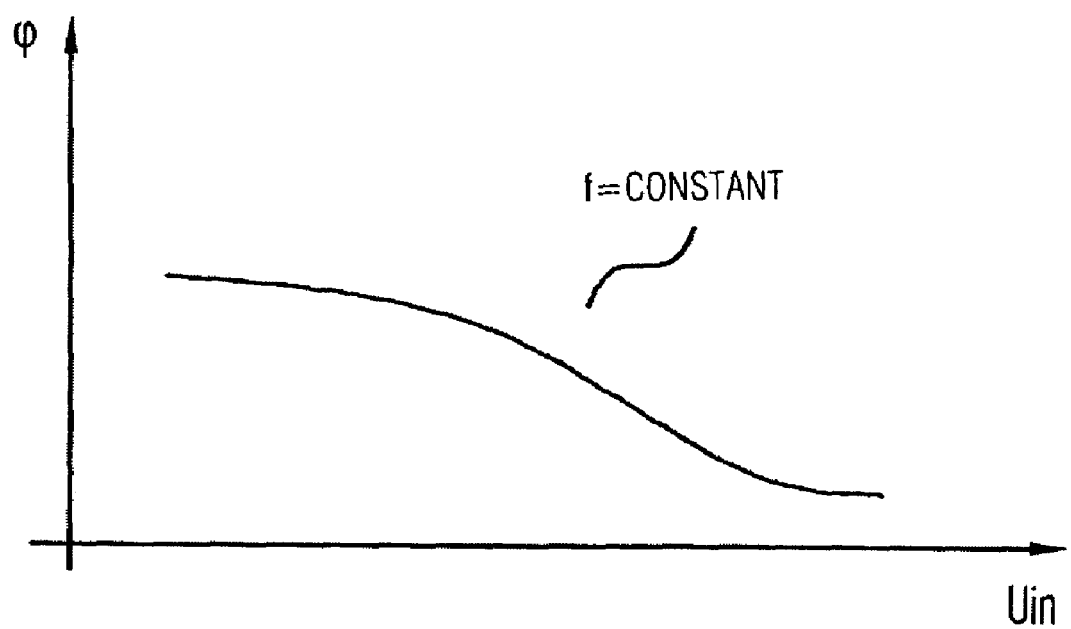
FIG. 6 shows the phase angle $\phi_{LT}$ at a constant frequency depending on an input voltage $U_{in}$.

The course of the phase angle $\phi_{LT}$ at a constant frequency is again shown in FIG. 6 depending on an input voltage $U_{in}$ present at the load. At a rising voltage $U_{in}$, the phase angle $\phi_{LT}$ becomes lower, because in this case more effective power is transmitted to the load, cf., for example, FIG. 5a, over-resonant operation. This results in the effective portion of the load current increasing. On the basis of this example, it becomes obvious that variations in the input voltage $U_{in}$ are reflected in the amount of the phase angle $\phi_{LT}$. Moreover, such variations in the voltage $U_{in}$ may be balanced by more power at first being passed on to the load by frequency decrease with a lowering input voltage $U_{in}$ in the over-resonant mode of operation. With rising input voltage, however, less power is at first transmitted to the load by frequency increase. By this frequency shift 506', the output voltage and thus also the (nominal) power is kept constant in the end.

Figure 7:
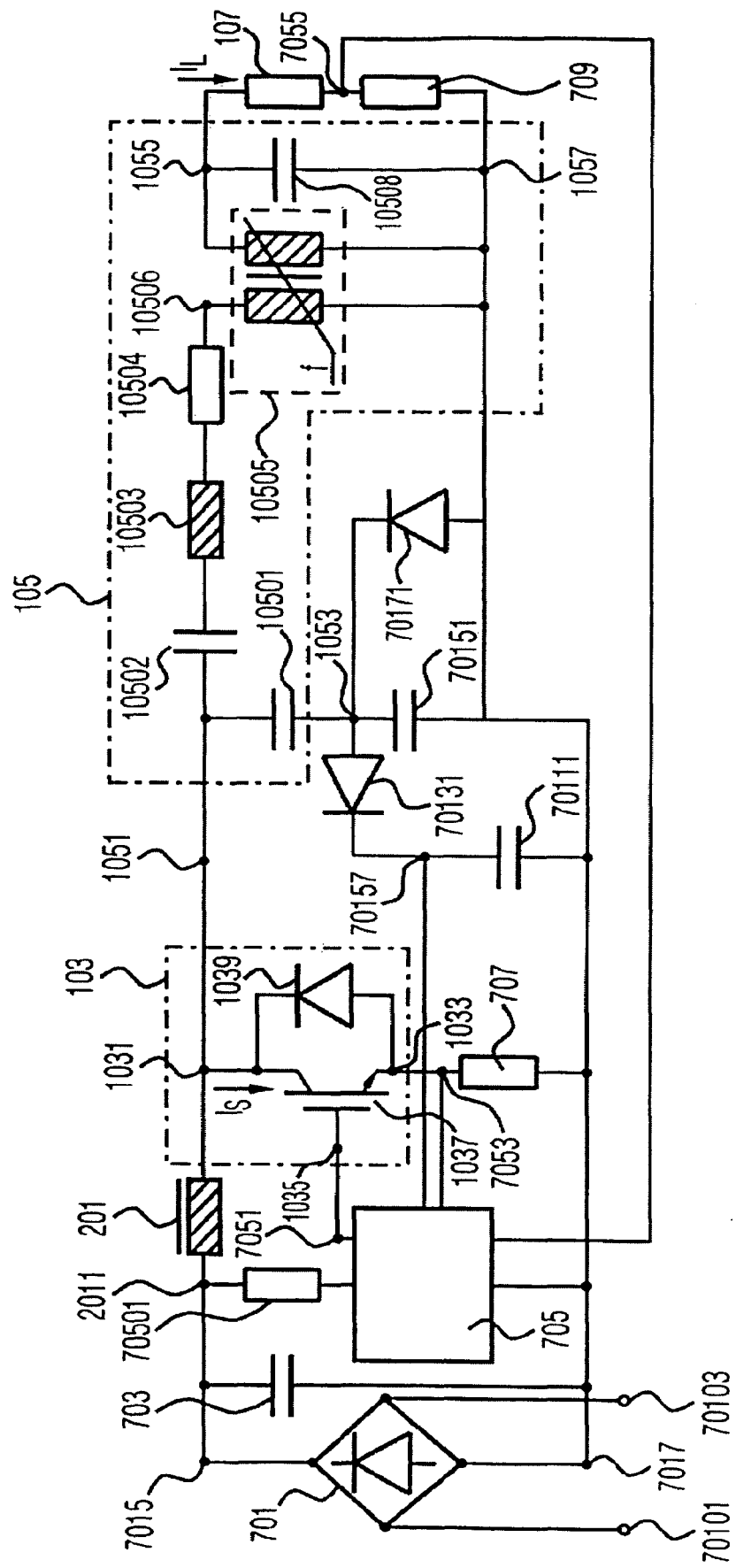
FIG. 7 shows a circuit for driving a variable load according to a further embodiment of the present invention.

In FIG. 7, an embodiment of an inventive resonance converter including switching frequency control is shown. Since this embodiment is based on the embodiment illustrated in FIG. 3, the functionalities with the same reference numerals will not be described again in the following.

In addition to the embodiment illustrated in FIG. 3, the embodiment illustrated in FIG. 7 first includes an input rectifier 701 with a first line terminal 70101 and a second line terminal 70103. Between an output 7015 and an input 7017 of the input rectifier 701, a capacity 703, which may for example be a charging capacitor, is coupled. A control part 705, along with a resistor 70501, is further coupled in parallel to the capacity 703. The output 7015 of the input rectifier 701 is further coupled to the first terminal 2011 of the input choke 201. The control part 705 further comprises a control output 7051 coupled to the control input 1035 of the switch 103 according to the present invention, which includes the voltage-controlled power switch 1037 in this embodiment. The control part 705 further comprises a first input 7053 as well as a second input 7055. The first input 7053 is coupled to the second input 1033 of the switch. Between the first input 7053 of the control part 705 and the input 7017 of the input rectifier 701, a sense resistor 707 is also arranged. A second sense resistor 709 is arranged between the load 107 and the second terminal 1057 of the converter 105. The second input 7055 of the control part 705 is coupled between the load 107 and the second sense resistor 709.

The control part 705 comprises a current supply input 7057 connected to the input 7017 of the input rectifier 701 via a capacity 70111, which may for example be embodied as a block capacitor. A first diode 70131 is forward-biased between the second terminal 1053 of the converter 105 and the power supply input 1057 of the control part 705. A parallel connection consisting of an external capacity 17151 as well as a diode 70171 operated in forward direction is coupled between the input 7017 of the input rectifier 701 and the first terminal 1051 of the input gate of the converter 105. In the following, the functioning of the resonance converter illustrated in FIG. 7 will be explained. The functionalities already discussed on the basis of the embodiments illustrated in FIG. 3 will, however, not be gone into again.

It is the task of the control part 705 to suitably detect the switch current $I_S$ designated with an arrow in FIG. 7 as well as the load current $I_L$, to determine a phase difference between the two currents and thus output a control signal for controlling the switching frequency of the switch 103 at the control output 7051. For this, at first a quantity dependent on the switch current $I_S$ is generated, which can be applied to the first input 7053 of the control part 705. In this embodiment, the switch current $I_S$ at the first sense resistor 707 is converted to a voltage present at the first input 7053. At this point, it should be noted, however, that the quantity dependent on the switch current may be generated with the aid of any functionality, for example by a current mirror or by a current-controlled voltage source.

On the output side, the piezo-transformer 105, with a voltage transmission ratio ü, drives a load with the load resistor 107, through which the load current $I_L$ flows. For detecting a quantity dependent on the load current $I_L$ in the embodiment shown in FIG. 7, a second sense resistor 709 is used, so that the load current $I_L$ across the resistor 709 generates a voltage present at the second input 7055 of the control part 705. On the basis of these two voltages, at first the phase difference between the switch current $I_S$ and the load current $I_L$ is determined in the control part 705 and, as has already been described above, a control signal controlling the switching frequency of the switch 103 is output.

The resistor 70501 provides a starting supply of the control part 705. The current supply of the control part 701 is realized via a primary-side terminal of the piezoelectric transformer 105 via a pumping circuit with the diodes 70131 and 70171, as well as via the external capacity 70151, while the capacity 70111 (block capacitor) smoothens the supply voltage of the control part 701. Thus, a simple energy supply device according to the present invention only contains three capacities 703, 70111, and 70151, which are for example implemented as capacitors, without particular requirements for electromagnetic compatibility and without further options for power factor correction, an input rectifier 701 (line rectifier), an input choke 201, a piezo-transformer 105, for example a fast IGBT 1037 with a reverse diode 1039, a possibly integrated control part 705, two diodes 70131 and 70171, as well as some very small resistors.

Figure 7A:
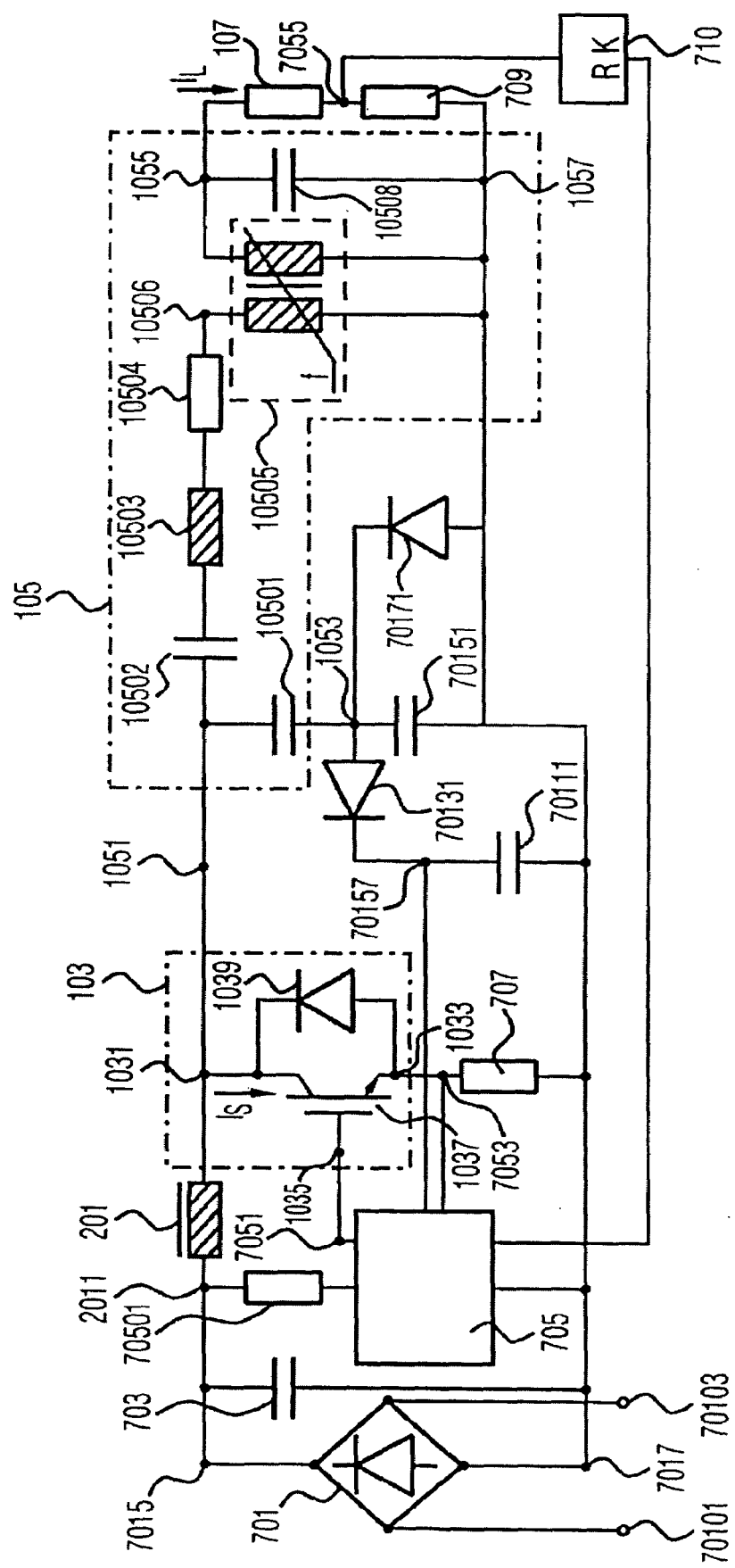
FIG. 7a shows a modification of the circuit shown in FIG. 7.

In FIG. 7a, a variant of the circuit in FIG. 7 is shown, wherein the piezo-transformer 105 has a galvanic separation so that the phase signal from the output 7055 is returned via an also galvanically separating feedback transmitter 710 to the control circuit. The feedback transmitter 710 may be easily implemented by simply transmitting the zero crossing of the load current $I_L$ as impulse. Alternatively, the sense resistor 709 could not be connected to the load 107 and the transformer output 1057, but with its first terminal to a tap electrically close to the secondary-side ground of the transformer 1057 and with a second terminal to the primary-side ground, which is given by the output 7017 of the input rectifier 701. The current flowing through this sense resistor is to pass in phase with the alternating current at the load output of the transformer by suitable design of the piezo-transformer. With this, the feedback transmitter 710 is left out, and the evaluation of the phase shift may take place against a uniform ground potential of the sense resistors 707 and 709.

The current supply device thus obtained may thus be accommodated in a very small space in a compact construction, with a constructional height of 10 mm being easily achievable, for example. For the input choke 201 (choke inductance), for example a constructional size of EF 13 up to a power of 18 watts is sufficient. For the piezoelectric transformer 105, for example a cylinder-shaped implementation at a height of 9 mm and a diameter of 20 mm may also be regarded as sufficient for a short-time maximum power of 18 watts. The nominal power to be regulated is chosen correspondingly smaller, with about one third of the maximum power at wide-range input. The transistor 1037, for example implemented as a fieldstop IGBT, may be accommodated in a small SOT package, and the control IC (integrated circuit) for the control circuit 705 may be packaged in an 8-pole standard package. A complete integration of the reverse diode 1039, for example a fieldstop IGBT 1037 as well as a control IC, can also be realized inexpensively in an 8-pole package as a multi-chip solution.

Figure 8:
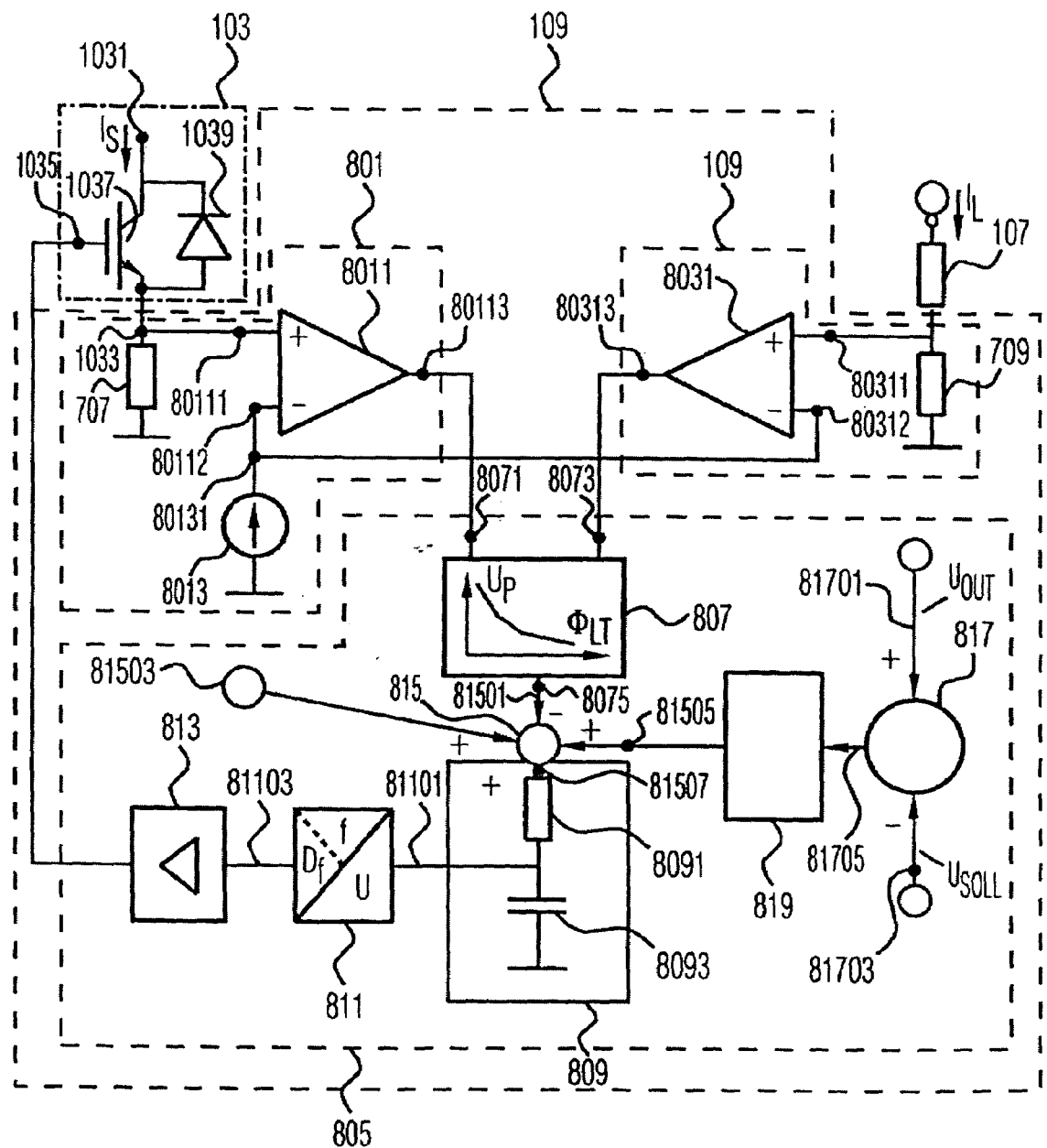
FIG. 8 shows a control circuit according to a further embodiment of the present invention.

In FIG. 8, an embodiment of the inventive control means 109 is illustrated together with the switch 103 and the load resistor 107. The control means 109 first includes means 801 for detecting a quantity dependent on the switch current $I_S$, means 803 for detecting a quantity dependent on the load current $I_L$, as well as a phase-locked loop 805 further comprising integrator means 809. The phase-locked loop 805 further includes means 807 for determining the phase shift between the switch current and the load current from the quantities detected by means 801 and by means 803. Means 807 comprises a first input 8071, a second input 8073, as well as an output 8075. The output 8075 of means 807 is connected to a first input 81501 of a comparator 815. The comparator 815 further comprises a second input 81503 as well as a third input 81505, and an output 81507. The output 81507 of the comparator 815 is coupled to a reference potential, for example ground, via a resistor 8091 and a capacity 8093.

Means 805 further comprises a voltage-controlled oscillator 811 (VCO) as well as a gate driver 813. The input 81101 of the VCO 811 is coupled between the resistor 8091 and the capacity 8093. An output 8103 of the VCO is coupled to an input of the gate driver 813, the output of which is coupled to the control input 1035 of the switch 103. In this embodiment, means 801 comprises a comparator 8011 with a first input 80111, a second input 80112, as well as an output 80113. The first input 80111 of the comparator 8011 is coupled to the second input 1033 of the switch 103. The second input 80112 is coupled to the output 80131 of a reference source 8013. The output 80113 of the comparator 8011 is coupled to the first input 8071 of means 807. Means 803 includes a comparator 8031 with a first input 80311 and a second input 80312, as well as an output 80313. The first input 80311 of the comparator 8031 is coupled between the resistors 107 and 709. The second input 80312 of the comparator 8031 is coupled to the output 80131 of the reference source 8013. The output 80131 of the comparator 8031 is further coupled to the second input 8073 of means 807.

The phase-locked loop 805 further includes a further comparator 817 with a first input 81701, a second input 81703, as well as an output 81705. Moreover, the phase-locked loop 805 comprises a regulator 819 coupled between the output 81705 of the further comparator 817 and the third input 81505 of the comparator 815.

In the following, the functioning of the embodiment shown in FIG. 8 will be explained.

In FIG. 8, the PLL regulating circuit is shown as a typical block circuit diagram. The zero crossings of the load current $I_L$ and the switch current $I_S$ are sampled via the sense resistors 707 and 709 by a comparison with the reference 8013 close to zero by two comparators 801 and 803 each generating, at their outputs 80113 and 80313, phase signals which are fed to means 807. By the phase detector 807, the phase difference is determined and compared e.g. with a target value, wherein the resulting differential signal, which is output to the output 80501 of the phase detector 807, is passed on to the integrator means 809 (filter) via the comparator 815. The function of the differential signal output at the output 81501 depending on the phase difference angle $\phi_{LT}$ is illustrated as tendency in the box representing the phase detector 807. The signal $U_P$ decreases with rising phase difference angle. This function can, for example, be realized by detecting the time, beginning from a zero crossing of the load current until a further zero crossing of the switch current, i.e. for example $(T-\phi_{LT})$, and converting it to a proportional voltage signal. T is the period duration of a switching period of the converter. The advantage of this signal detection is a sufficiently large time window as compared with the direct detection of phase differential angle $\phi_{LT}$ according to FIG. 4.

By the comparator 815, the developing signal is added, with a negative sign, to two further signals, each of which can be applied to the inputs 81503 and 81505 of the comparator 815. To the second input 81503, a signal for detection of the input voltage supplied from the energy source 101 from FIG. 2 is applied. This signal will usually not be equal to the input voltage, but may represent a convenient, for example proportional, partial amount of the input voltage. At the third input 81505 of the comparator 815, a regulator output voltage of the regulator 819 is present, or a voltage dependent on this voltage, such as a proportional partial amount of this voltage. This regulator output voltage may further be a function of the output voltage of the converter versus the load 107, which is routed via the comparator 817 and the regulator 819 in this special example.

At the first input 81701 of the further comparator 817, furthermore, the for example rectified output voltage is present, and at the second input 81703 of the comparator 817, a target value is present, with which the voltage present at the first input 81701 is compared. The result of this comparison is output to the output 81705 of the further comparator 817 and provided to the regulator 819, which further distinguishes itself by suitable, sufficiently large amplification. At the output of this regulator, the signal present at the third input 81505 of the comparator 815 is thus output. By addition of the voltages present at the inputs 81503 and 81505 and by subtraction of the signal present at the input 81501, a comparison signal develops, which is output to the output 81507 of the comparator 815, which is forwarded via the integrator means 809 (filter). The filter (809) may also be switched upstream of the generation of each of the three signals for each individual signal, for example in the form of a delaying electronic or microelectronic circuit.

As a downstream filter, the integrator means 807 causes necessary stability by limiting the regulating speed to an admissible measure. The regulator 819 may then be equipped with variable parameters, without losing the stability of the system. With this, different regulation strategies may be realized. For example, a slower regulation may be used when a system is to work with little energy, and the clock frequency of a processor or micro-controller is therefore to be low. The signals present at the inputs 81503 and 81505 may be clocked signals (for example PWM (pulse width modulation) outputs of a micro-controller), which are smoothed by the integrator means 809 and converted to a resulting DC signal.

In the simplest case, the filter 809 may contain an RC member, consisting of the resistor 8091 and the capacity 8093. At this point it is to be noted, however, that the integrator means 809 may be realized with the aid of other elements having integral behavior, such as a suitably connected operational amplifier.

The filter output signal is forwarded to a VCO 811 generating a suitable frequency f and an accompanying duty cycle $D_f$. The output signal is passed on to the gate 1035 of for example an IGBT or MOSFET 1037 via a gate driver 813. The voltage $U_{out}$ present at the first input 81701 of the comparator 817 is generated directly or by a voltage split from the rectified output voltage at the load 107. With this inventive embodiment of the overall system, both by a fully integrated solution of a control IC and by a partially integrated analog control solution, which is accompanied by a micro-controller, only a low-side control circuit is required, in which all required circuit parts of the regulation can be realized with low operational voltage. The combination of an analog control IC with a micro-controller enables an enhanced interface (e.g. a bus connection), enhanced, flexible regulation properties or battery management for a charger.

The regulation according to FIG. 8 works as follows. When the output load increases (small ohmic resistance), according to FIG. 5, a smaller transmission ratio will develop. At the same time, however, the phase angle $\phi_{LT}$ decreases, so that the voltage output to the output 81501 is summed with a negative sign, with the load voltage not yet having decreased due to the output-side buffering via the capacity 703 (charging capacitor). With this, the filter 809 is imparted with an at first overall smaller voltage. As a result, the frequency decreases via the VCO 811, so that greater power is transmitted according to FIG. 5 and the transmission ratio ü increases again. Thereby, a smaller frequency, which causes an increase of the transmitted power so that the output voltage remains about constant despite the greater power consumption, is adjusted at the gate of the transistor 1037 with a time delay by the filter 809 via the VCO 811. With this, on the over-resonant characteristic curve according to FIG. 5, an almost constant or rising transmission ratio ü is reached by a frequency decrease 506. Thereby, along a transmission characteristic curve in FIG. 5, greater power and a further decreasing phase angle $\phi_{LT}$ is achieved until the output voltage increases slightly. Via an amplification factor of the regulation 819, an over-proportional enlargement of its output signal is achieved with this, whereby the summing signal at the VCO is again enlarged via the filter 809. With this, the regulation comes to a standstill by the frequency in the over-resonant mode not being decreased any further. The signal 81501 thus generates an underlaid phase current regulation, which immediately counteracts a load current by a power change such that the output voltage remains about constant, as it is hoped for, and only needs little post-regulation by the voltage phase-locked loop of the regulator.

Conversely, the same applies for a decrease of the load (increase of the load resistance 107) as well as for changes in the input voltage. When the input voltage of the converter rises, the phase angle $\phi_{LT}$ according to FIG. 6 becomes smaller by the rising output power according to FIG. 5a. By adding a greater negative value of the voltage output at the output 81501 of means 807, however, the power is increased further by the decreasing frequency. But by a counteracting enlargement of the signal present at the second input 81503 of the comparator 815 this is over-compensated so far that as a result a constant output power develops by the frequency being increased nevertheless by the filter 809 and the VCO 811, as this is shown in FIG. 5a by the graph 506. According to FIG. 5a, if thereby a greater or smaller output power is transmitted, the regulation mechanism via a slightly changing output voltage again starts by the regulator 819 counteracting a power change, which in the this case equals an output voltage change. This again entails an adaptation of the phase angle $\phi_{LT}$, so that the regulation comes to a standstill. The regulating application of the regulator 819 has to meet the stability criteria of the regulating circuit in connection with the overall time delay of the regulating circuit, which will always be greater than the time constant of the filter 809. At this point it is to be pointed out that the signal present at the second input 81503 of the comparator 815 may be generated from the input voltage 101 of FIG. 2 or 3 with the aid of, for example, a comparator and a further reference, as has already been discussed in connection with means 817.

As has been already mentioned, the VCO 811 further distinguishes itself by a duty cycle $D_f$ which is adjustable. In order to explain the functioning of the oscillator 811, it is necessary to return to FIG. 4 again. The inventive class E amplifier is operated such that the switch is turned on, if necessary with a time delay, after the switch voltage has become zero. Here, turn-on times of typically D=0.25 . . . 0.45 result, to obtain an optimum limitation of the switch voltage. According to the invention, these turn-on times are supplied by the voltage-controlled oscillator 811, namely such that the current in the switch only increases during the turn-on time, as it is made clear in FIG. 4 by the course of $I_S$ in an interval marked by $t_{on}$. The VCO 811 is thus designed so that it provides a duty cycle $D_f$ necessary for this. This may, for example, be realized by means for adjusting a predetermined duty cycle of the output signal of the oscillator 811 not shown in FIG. 8. The duty cycle may be adjusted in a frequency-dependent manner, and optionally also depending on further quantities, such as input or output voltage.

Figure 9:
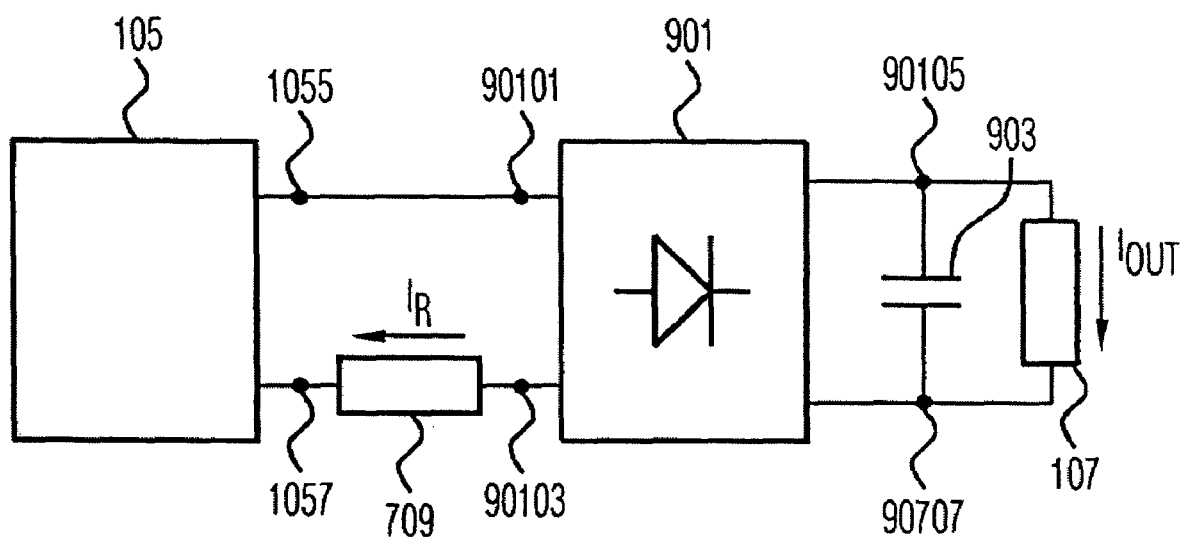
FIG. 9 shows an embodiment of a secondary-side rectifier of a current supply with load circuit.

FIG. 9 shows an embodiment of a secondary-side rectifier 901 of a current supply. The first input 90101 of the rectifier 901 is coupled to the first output 1055 of the converter 105. Between the second input 90103 of the rectifier 901 and the second output 1057 of the converter 105, the resistor 709 is coupled. A capacity 903 is coupled between the first output 90105 and the second output 90107. The load resistor 107 is implemented in parallel to the capacity 903.

The converter 105 (piezo-transformer) generates an output AC voltage between the outputs 1055 and 1057. Here, the load-side AC current is conducted via the sense resistor 709. Downstream, a rectifier is connected, which may embody a full-bridge rectifier or another rectifier circuit. The capacity 903 connected on the secondary side at the output of the rectifier 901 may also be a charging capacitor. The resistor 107 here embodies the output-side ohmic load, which may also represent a battery or an electronic device. The output DC voltage is present across the load 107, whereas the output direct current $I_{out}$ represents the ohmic effective current through the load 107. The voltage $U_{out}$ in FIG. 8 is generated either directly or by a signal, for example, proportional thereto from the voltage across the load 107.

It becomes clear from the previously described embodiments of the present invention that the improvements as opposed to the prior art mean that a resonant inverter, consisting of a self- or externally-excited class E amplifier, allows high efficiency as well as limited load change and limited input voltage variation with a mode of operation adjusted to resonance frequency at a high frequency, using an electromechanical energy converter with high load-circuit quality, by using a dynamically quick switch with an at least threefold reverse-biased voltage as opposed to the maximum input DC voltage, and the input choke used may be made sufficiently small. Since only one switch and a relatively simple control circuit are required, the circuit can be realized as a one-chip solution (e.g. in a SMART POWER technology), or in a known inexpensive multi-chip implementation without the necessity of a bridgeable technology for the control circuit. Using for example high-voltage power switches (e.g. fieldstop IGBTs, cool MOS), operation at rectified line voltage is possible. The required control circuit works in a very low-loss manner, in particular when using MOS transistors or quick IGBTs, just like the switch and the electromechanical converter, which can also be made very small here contrary to the limitations set forth in document (10), particularly by defining and adapting the parameters of the piezo-transformer. By the use of MOS switches or also quick IGBTs, high switching speed is attainable. Owing to a frequency increase resulting therefrom, the capacitive and the inductive devices of the overall arrangement become smaller, such as the input choke, which is only imparted with a partial alternating current portion. The latter thereby takes over the input-side line current smoothing, whereby additional line filter overhead is reduced. A resonance inductance is thus no longer required, just like a high-side driver means, which is not, or only with limitations referring to the control accuracy, given for comparable half-bridge solutions with narrow-band energy converters. Moreover, no reactive devices (capacitors, inductances) are required in the load circuit and are completely replaced by the piezoelectric transformer.

As opposed to a conventional flyback converter topology, the cost-intensive low-scattering transformer is replaced by an inexpensive piezo-transformer and an input choke, which partially reduces the line filter overhead. By symmetric design of the output circuit of the piezo-transformer with a center tap, the output current may be distributed to two rectifier diodes. With this, their individual heat-up reduces, so that the loss power at a large output current is better distributed thermally than in a flyback converter, the diode of which has to carry the entire load current.

As opposed to an intensive evaluation of the load current for the adjustment of the nominal power according to (3), for the class E circuit chosen only a phase comparison between the zero crossings of the load and switch currents is required to roughly adjust the nominal power. Thereby, the regulating circuit is simplified and may be integrated as an analog circuit on a smaller chip area as if expensive evaluator circuits were used for the load current (amplitude). By an additionally overlaid regulation to the target value of the output voltage, instability may be avoided better as opposed to direct voltage regulation, without abandoning the maximum regulation speed possible. This applies particularly to charging a secondary-side smoothing capacitor and to a quick load change. The disadvantage of the instability of a regulating circuit, working via the phase shift of the voltage of the class E amplifier for example according to (6), is avoided with this.

The voltage transformation ratio of the electromechanical converter with reference to the sine transmission and resonance frequency is chosen at 5:1 to 100:1 in adaptation to typical line applications for line current supplies and chargers (e.g. for PCs). The input line voltage may range from 80 to 260 volts AC. From the electrical filter behavior of the electromechanical converter (e.g. piezo-transformer), then a load voltage results in a typical range of the current supplies (e.g. 1.5 to 20 V). At other transformation ratios, a load adaptation with optimum switching voltage limitation would not be achievable for the line applications described in this circuit topology, which is why the correctly dimensioned transformation ratio in the nominal load operation is a substantial basic idea of the inventive solution.

Furthermore, the input capacity of the electromechanical converter is to be chosen so that, apart from the semiconductor switch connected in parallel to the converter input, no further parallel capacity is required. The value of the input capacity will range from 100 pF to 1 nF depending on the input voltage at a frequency of typically 100 kHz and a power of 20—20 watts. At a small input voltage (80–160 V AC) the value of the capacity is to be chosen at about 500 pF to 1 nF, and at a large input voltage (160–260 V AC) this value is to be chosen at about 100 pF to 500 pF.

The capacity of the switch acting parallel hereto lies in an order of magnitude of less than 200 pF. For other power ranges, the value of the input capacity shifts upward (greater power) or also downward (smaller power). Such an adaptation is possible by the construction of a piezoelectric transformer. Preferably, a circularly or also a laterally vibrating piezoelectric transformer is employed here. But a piezoelectric transformer working on the basis of a thickness vibration or a rose-type transformer are less suited for this application, because they do not allow a corresponding downward transformation ratio in the given power range and the demanded input capacity at sufficient efficiency. At this point it is to be pointed out, however, that two types of piezo-transformers may be employed according to the invention.

Moreover, the output-side capacity of a piezo-transformer helps, in an idle operation, to stabilize the class E zero voltage circuit and is well suited for this as the load in connection with this narrow-band electromechanical converter. For this, the piezoelectric transformer is designed such that its voltage transmission function has a sufficient bandwidth, which, as has been already mentioned, approximately follows a Gaussian function with reference to the frequency and is chosen so broadly that a decrease of the voltage transmission ratio occurs at a deviation from the resonance frequency. Thereby, control or regulation for the adjustment of the output power may be implemented in a technically reliable manner also at not exactly constant output voltage via the detection of a load current when the frequency bandwidth is at least about 5–10% of the nominal frequency until the drop to half the power. The nominal frequency for this application is typically 50–200 kHz. In this range and by the effect of the output capacity at a rising load voltage or a falling effective power, the behavior of the class E circuit with reference to the zero voltage circuit and the switch current stress hardly changes, so that no substantial changes occur with reference to the switch maximum current, the switch reverse current, and the switch maximum voltage at about constant relative turn-on time. By the inventive choice of the transformation ratio and the input capacity of the piezo-transformer, sufficient frequency bandwidth is achieved with suitable technology of the piezo-transformer.

The class E converter reacts to an increasingly capacitive or a less ohmic output load with an increase of the reactive current portion, without violating the zero voltage condition. Here, the inherent output capacity of the piezoelectric transformer has a stabilizing effect in this sense.

Furthermore, a small external capacitive load is required, which may be already given by the capacity of the rectifier diodes, in order to prevent the increase of the output voltage above an allowed limit and at the same time meet the zero voltage condition. Thus, the switch voltage continues to return to zero, even when the load has become very small or has been removed. With this, only the reverse current portion in the switch increases. For the case that no more effective power is transmitted to the load, the maximum reverse current equals the maximum switch-on current of the switch. Thus, detection of the load circuit interruption may take place by sampling the reverse current in the switch, without having to monitor the load voltage. But the optimum relative turn-on time changes with the frequency and has to be tracked within the bandwidth at greater frequency changes. But this is rarer for a fixed-point load within a PLL regulation or not required at all and will only have to be applied at a power position in a larger range or in a wide input voltage range.

When there is a variation of the input voltage, the transformation ratio of the electromechanical converter changes little so that the power changes approximately with the square of the input voltage. If the input DC voltage of the converter becomes smaller, the effective current and the reactive current in the load circuit decrease correspondingly, and the switch reverse current decreases. If the reverse-biased voltage reserve of the switch is large, the input capacity of the piezoelectric transformer may be made smaller to achieve a zero voltage switching (ZVS) up to smaller input voltages. If the reverse-voltage reserve of the switch is, however, small, the input voltage must not fall below a certain minimum value. But this value is small enough to balance the usual voltage fluctuations of the grids and additionally allow a greater voltage variation at the input charging capacitor, due to the sufficiently large output capacity of a piezoelectric transformer with falling ohmic load. If the load is removed, the constant or slightly rising capacitive output load of the piezoelectric transformer on the one hand causes the zero voltage switching to be maintained by the rising reactive current portion compensating for the missing load current portion. On the other hand, the switch maximum voltage does not become substantially larger, since the effective input current decreases and has to be compensated by a smaller portion of the load current, wherein also the entire relative turn-on time remains constant.

If the ohmic load becomes greater, the reactive current portion drops to smaller values, so that the switch maximum voltage is also not exceeded in this case. If the ohmic load is too large, the zero voltage behavior would no longer be achieved, so that the additional power consumed at the switch would thereby be converted to heat. With this, the switch maximum voltage is also not exceeded by no longer increasing the transmitted power. For the case that too great a load is used, it can be recognized by detection of the voltage return at the switch, so that overload of the switch may be avoided by switching off the converter or regulating it to a smaller output voltage. Thus, as a switch, a device may be employed, whose admissible maximum voltage is not exceeded in any possible operational state of a load with an electromechanical converter (piezoelectric transformer). For this reason, also a non-avalanche-resistant switch (MOSFET or IGBT) is well suited for this application, since the output capacity of the converter acting back on the input has a compensating effect with decreasing ohmic load. This property is given in most cases by the employment of inventively dimensioned piezoelectric transformers.

By the employment of non-avalanche-resistant devices, in particular fieldstop IGBTs as switches, the present application becomes more inexpensive by not having to employ a protective element against over-voltages at the switch, because the output circuit already guarantees the protection of the switch by its electromechanical, and thus electrical, properties.

As it has already been mentioned, for control and regulation of a converter constructed in this way one can evaluate the phase angle between the load current and the switch current. The switch current is only overlaid by the direct component of the input choke, which changes the phase shift by a fixed magnitude and is therefore not or only slightly dependent on the power or input voltage. If the input choke of the converter is chosen so small that the choke current can decay to zero or become smaller than zero, the portion of the overlaid direct current may be reduced significantly or almost made zero from the side of the choke, because then the choke current reaches about a zero crossing typically at the moment of turning on the switch. Even when the input choke is chosen greater, phase detection for power regulation is possible and only has to be adapted slightly to the respective value of the input choke, because the effective input current is significantly smaller than the load current in this application.

The variation of the input voltage can also be balanced via the phase detection and corresponding frequency change, because the capacitive portion of the output current in the converter increases when the effective power becomes smaller due to falling input voltage.

When too small an input voltage is present, the transformation ratio aimed at is not achieved at nominal frequency when the load impedance becomes too great. The electromechanical converter usually has the property of transmitting, at decreasing input voltage, a power decreasing therewith quadratically.

On the other hand, if the ohmic output impedance becomes greater, the converter can only react with an increase of the output voltage, even if a small input voltage is present. Thereby, the transformation ratio shifts toward greater values and the converter-internal losses increase slightly. But at the same time the inherent output capacity of the converter is subjected to a greater voltage, whereby the capacitive current portion increases and the ohmic current portion decreases. The enlargement of the transformation ratio may be adjusted by a design of the electromechanical converter so that the output voltage increases from maximum load (minimum load resistance possible) toward smaller loads (greater load resistance) so that the resulting substitution resistance remains about constant or changes little with reference to the input.

Thereby, the class E converter may be operated in a wide input voltage range at variable load without violating the zero voltage condition and by being able to vary the transmitted power only by small frequency changes. Accordingly, it is also possible to keep the phase angle between load and switch current about constant and thereby balance both changes in the input voltage and changes in the output load, meeting the ZVS condition. This possibility is not given in such a wide range of load and input voltage changes in a transmitter with constant parameters, in particular with a constant transformation ratio. If the output voltage is to be kept constant, a natural limitation of the voltage may be devised by a small external additional capacity. The transformer is designed for the dynamically maximally demanded output power and nominal output voltage. If the power decreases due to decreasing load, smaller output power at equal output voltage may be adjusted by a frequency change. With this, a voltage return at the switch is guaranteed again by lowering the effective current and increasing or maintaining the secondary-side active current.

Due to the transmission characteristic curve quickly falling with for example rising frequency, the nominal voltage at the output may always be adjusted by a small frequency change. The voltage transformation ratio remains about constant in this case, because on the one hand the power transformation ratio decreases, and on the other hand the ohmic load disappears and is replaced by a capacitive load. It can be observed that the loss power in a piezo-transformer may rise when not enough effective power is consumed and the output voltage rises at the same time. For this reason, a limitation of the output voltage by a frequency change is also required in a load-free state. Most current supplies require more or less constant output voltage, so that low-loss operation is given in all load cases.

The size of the input choke may further be utilized to adjust the power within certain boundaries at a given frequency. If the input choke is made greater, the transmission power increases by the effective stored energy in the input choke increasing at the same frequency due to the electric characteristic of the class E converter, which is passed on to the load circuit. The adjustment of the power via the input choke is, however, only possible within smaller boundaries due to the limited bandwidth of the electromechanical converter and would affect the overall power insignificantly within the usual tolerances of inductive devices. On the other hand, the adjustment of the input choke may be used for the adjustment of the working point if no other adjustment is to take place. An advantage of the finite implementation of the input choke is thus the possibility of the adjustment of the load power. If the input choke is implemented too large, it may in fact cause improved smoothing of the current harmonics to the grid (spurious voltage), but also causes a necessary adaptation of the input capacity of the converter to smaller values in a power increase and in a constant transformation ratio or to a smaller downward transformation ratio and constant or greater input capacity of the converter.

For the typical downward transformation ratio of 5:1 to 100:1 in a nominal load operation and the other electrical data mentioned, the values for the input choke required for a typical implementation of the invention are to be chosen between 3 mH and 20 mH at a typical frequency of e.g. 100 kHz.

For the adjustment of the respective nominal power desired, temporally after the detection of a present load, a PLL regulation loop is put into operation, in which the zero crossings of the switch and load currents are sampled and passed on to a phase detector. Furthermore, this phase difference is routed to a filter generating a smoothed output voltage. This is switched to a suitable VCO (voltage-controlled oscillator), which is to be adjusted to a target value (target value comparison) and comprises a suitable amplification. The output signal of the VCO is returned as a frequency signal with the accompanying inventive duty cycle (constant or slightly variable within the mentioned range) to the switch (gate of an IGBT or MOSFET) via a driver. Here, the duty cycle may slightly increase with falling frequency and slightly decrease with rising frequency, or it is kept constant.

For more accurately regulated output voltages, separate consideration of input voltage variations and load variations is convenient. But-here the phase signal between the load and switch currents is first detected again and converted to a phase voltage signal. This signal is added in opposite polarity to a signal of the input voltage detection and a signal of the load voltage detection. The resulting voltage may now react to a downstream VCO via a filter in the way described. The signal of the load voltage detection may be generated from a difference of the load voltage and a target value. It is at the same time added with a sufficiently great amplification to the phase difference signal in order to keep a regulation deviation as small as possible. The signal of the input voltage detection is also imparted with an adapted amplification to about balance the power change to be expected at a certain input voltage variation. The amplification of the signal would therefore be smaller than that of the output voltage detection. Thus, there is always an underlaid phase difference regulation, which immediately reacts to load and input voltage variations. This regulation is supplemented by the external regulating circuit to a constant output voltage. This regulating circuit may be implemented, according to demand, as a PID regulator, or in the simplest case as a P regulator. Instead of an underlaid current regulation, which does not allow any statement on the output-side effective power, the phase difference regulation is always a reliable measure for a quick reaction to effective power changes. For example, if capacitive sinks are connected at the output, current detection will report the increased active current also as a signal for counter-regulation. For this not to take place, the effective currents would have to be filtered at an output via smoothing and rectification in order to obtain a convenient signal for the current regulation. This means, however, further temporal delay, whereby the regulator reacts more slowly than in the present phase difference regulation.

The described invention is particularly suited for current supplies in which mostly a constant output voltage independent of the load is required. In order to obtain this, the phase angle is detected and a phase voltage is generated therefrom. For example, when the load becomes smaller, i.e. a sink suddenly "draws less current", the phase angle also becomes greater. With this, the phase voltage changes according to the diagram in block 807 of the phase detector. If this is switched negatively to the comparator 815 here, the negative value subtracted from further positive values at both other inputs of the comparator decreases, and with this the resulting voltage at the VCO becomes slightly greater. With this, the frequency is increased, and thus the transmitted power is decreased. With this, the voltage at the load is prevented from rising, because the load has become the more high-ohmic. If one was not regulating in the "same direction" as the load changes, the voltage could not be kept about constant.

This phase comparison regulation may, however, be inaccurate, which is why it is advantageous to improve it at an exactly required output voltage. If no sufficient power reduction is achieved via the falling curve of the transmission function of the transformer by defined frequency increase, the output voltage will indeed slightly change. Either it is suddenly too large, because the power has not been reduced enough by a frequency increase corresponding to the smaller load. Or it is too small, because the power has been decreased too far. It is, however, possible that these changes are not large enough, because the system is approximately correctly adjustable when for example the amplification of the VCO is chosen correctly. But the whole is nonlinear, and thus it may be difficult to find an exact constant amplification largely balancing all load changes by the phase regulation. So a second signal may be given via the regulator at for example rising voltage, which changes more strongly and already counteracts tiny output voltage changes by clear frequency changes.

But here it has to be paid attention to that the system does not start to vibrate. If the output voltage has become a bit too large despite phase difference regulation, the signal is compared with the target value in FIG. 8 and provides a small value greater than zero to the regulator. This generates a greater positive value therefrom, and with this the frequency is increased even further by the voltage at the VCO rising summarily. With this, the frequency is increased further until the output voltage has again reached the target value, and the process comes to a standstill. If it is required to provide a changed value from the regulator to the comparator 81505, this may take place via a PI regulator, which stops at this new value at the 81505 input and makes the regulation deviation zero.

Concerning the input voltage, there is at first a counter-productive state. When it rises, soon more power is transmitted due to the characteristic curves in FIG. 5a. But now the phase angle becomes smaller. This causes a greater voltage to be switched onto the comparator, but with a negative sign. Thereby, the sum at the output of the comparator decreases and the frequency would decrease even further, so that even more power would be transmitted. But this is prevented by the signal 81503 now becoming greater at the same time and again increasing the voltage at the input of the VCO in an even over-proportional manner. With this, the effect is over-compensated by this input voltage signal having greater amplification at the comparator than the phase difference signal. Thus, here also rough regulation is achieved, because the input voltage signal is there earlier than the changed phase difference signal, which occurs with a time delay via the dynamic time constant of the class E amplifier, i.e. already the input choke.

Also in the case just described, it may be that the signal changes of the input voltage signal and the phase difference signal do not completely compensate each other with reference to the resulting output voltage. Then the regulator 819 acts again and determines even small output voltage changes by switching them onto the comparator via its amplification until the regulation deviation is eliminated.

Regarding the stability criteria of time constants and regulation amplification for a regulator, the following statements may be taken into account.

If the regulator is provided, assumedly, with a very large amplification (P portion), the resulting signal will generate over-proportionally strong frequency changes at the VCO. With this, the regulating circuit will of course become unstable at some time, if, for example according to Nyquist, all delays and amplifications for the set-up of the Bode diagrams are used. A minimum time delay is always given by the delay member to keep the regulating circuit stable with reference to phase difference regulation in connection with input voltage regulation to such an extent that noise is not regulated out. Such "noise" is for example already generated by only sampling the phase difference once per period duration. Therefrom, only a discrete, and even sharp change in the phase voltage Up can result. For such a possible jump not to lead to an immediate reaction of the VCO, it is smoothed with the RC member (or another low-pass filter) at least over one period duration. Likewise, the input voltage may also be "noisy". There are for example short spikes that the converter does not even notice due to its dynamic inertia (the input choke acts like a low-pass filter). It is not desired to regulate these spikes. But if the regulator for the output voltage 819 generates changes so great that the overall time constant of the regulating circuit is too great, so that the output voltage begins to vibrate, the amplification has to be reduced- The overall time constant is always greater than that of the filter 809, because the following time delays are added to it: VCO, driver, half period duration of the class E converter, and above all smoothing capacitor at the load, to mention only a few. For this, (linearized) regulating circuit models in which the time constants are taken into account and only admissible amplifications are used, have to be found in various operational cases. If the time constants of the (two) locked loops were equal to zero also depending on different input voltages, of course arbitrarily high regulator amplification could be used, because the system would indeed react immediately. But if the overall time constant of the voltage locked loop is greater, the amplification has to be decreased, because otherwise there would be a back-and-forth jumping with the frequency, without the phase signal reacting to it in time. Presently, no exact models for this can be given as these are only qualitative statements. The better the underlaid regulation of the phase difference in connection with the input voltage balances regulation deviations, the higher the regulator amplification of the output voltage above 819 may be chosen. Because thereby only smaller output voltage deviations are reacted to with greater amplification, so that the regulation seems to become "quicker". If the charging capacitor at the output is very small, only a smaller regulator amplification can be worked with, because then a load change is again recognized more quickly and is possibly counter-regulated too strongly, so that the rest of the time constant of the regulation path is already too large, and vibrations may occur.

Regarding the quantity dependent on the input voltage, which is supplied via the input 81503, it can be stated in addition that the signal representing this quantity will be substantially proportional to the input voltage. Alternatively, this quantity could be indirectly proportional to the input voltage or have developed from a target value comparison and then be switched negatively. Here, also a target value comparison and ensuing negative switching could again be performed, so that the tendency of the proportionality remains, maybe taking direct components, final values, etc., into account.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A resonance converter for driving variable loads, comprising:
    a transformer with an input gate and an output gate for providing an output signal for driving the variable load;
    a switch for providing an input signal from a source to the input gate of the transformer;
    a controller for controlling a switching frequency of the switch;
    wherein the transformer is dimensioned and connected such that a downward transformation ratio between the input signal and the output signal is from 5:1 to 100:1 when providing nominal power to the variable load; and
    wherein the controller for controlling the switching frequency of the switch is designed on the basis of a phase shift between a switch current and a load current at variable load and/or variable output voltage.

2. The resonance converter of claim 1, wherein the transformer is a piezo-transformer.

3. The resonance converter of claim 1 with an input gate connected to a source, which provides an input voltage from which the switch generates the input signal for the input gate of the transformer, wherein an input capacity of the transformer is adjusted depending on the amount of the input voltage and the nominal output power.

4. The resonance converter of claim 3, wherein the input capacity of the transformer is fixedly adjusted to a value between 100 pF and 1 nF.

5. The resonance converter of claim 3, wherein the input voltage is between 80 and 160 volts and the input capacity of the piezo-transformer is between 500 pF and 1 nF.

6. The resonance converter of claim 3, wherein the input voltage is between 160 and 260 volts and the input capacity of the transformer is between 100 pF and 500 pF.

7. The resonance converter of claim 1, further comprising an input choke connected between the source and the switch arranged in parallel to the input gate of the transformer.

8. The resonance converter of claim 7, wherein the inductance of the input choke comprises a value of 3 mH to 20 mH.

9. The resonance converter of claim 1, wherein the switch includes a voltage-controlled power switch, which may be implemented as a fieldstop IGBT or a cool MOS transistor, with a first input, a second input, and a control input to which a control signal can be applied.

10. The resonance converter of claim 9, wherein a diode is connected between the second input and the first input of the voltage-controlled power switch.

11. The resonance converter of claim 3, wherein the controller is designed so as to adjust the switching frequency of the switch on the basis of a quantity dependent on the input voltage and/or a quantity dependent on the output voltage dropping across the load.

12. The resonance converter of claim 11, wherein the controller comprises a combination member for combining a quantity dependent on the phase shift, the quantity dependent on the input voltage, and the quantity dependent on the output voltage falling across the load for generating a combined signal on the basis of which the switching frequency of the switch is controlled.

13. The resonance converter of claim 1, wherein the controller includes a detector for detecting a quantity dependent on the switch current, a detector for detecting a quantity dependent on the load current, and a determinator for determining the phase shift between the switch current and the load current from the detected quantities.

14. The resonance converter of claim 11, further comprising a generator for generating the quantity dependent on the output voltage present at the load as a combined signal on the basis of a comparison of the output voltage or a rectified version thereof with the reference voltage.

15. The resonance converter of claim 12, wherein the controller comprises a locked loop for regulating the combined signal to a nominal value.

16. The resonance converter of claim 12, wherein the controller further includes an oscillator, whose frequency is adjustable depending on the combined signal and whose output signal serves for controlling the switch.

17. The resonance converter of claim 16, further comprising an adjuster for adjusting the predetermined duty cycle of the oscillator.

18. The resonance converter of claim 1, wherein the variable load represents a voltage supply for a device.

19. The resonance converter of claim 1, wherein the transformer is a piezo-transformer and has complete galvanic separation between input gate and output gate.

20. The resonance converter of claim 19, wherein a tap galvanically separated from the output gate is present, which provides a signal in phase with reference to the output current relative to one of the terminals of the input gate.

21. A method of driving variable loads by a resonance converter including a transformer with an input gate, wherein the transformer is dimensioned such that the voltage downward transformation ratio between the input signal and the output signal is from 5:1 to 100:1 when providing nominal power to the variable load, a switch and a controller, comprising the steps of:
controlling a switching frequency of the switch by the controller on the basis of a phase shift between a switch current and a load current at variable load and/or variable input voltage, in order to apply an input signal to the input gate of the transformer and thereby generate an output signal for driving the variable load.

22. The method of claim 21, wherein a piezo-transformer is used as transformer.

23. The method of claim 21, comprising the steps of:
detecting a quantity dependent on the switch current;
detecting a quantity dependent on the load current;
determining the phase shift between the switch current and the load current from the detected quantities.

24. The method of claim 21, comprising the steps of:
detecting a quantity depending on the output voltage dropping at the load, and/or detecting a quantity dependent on the input voltage;
detecting a quantity dependent on the phase shift;
determining a combined signal from at least one and maximally all of the detected quantities.

25. The method of claim 24, comprising a step of regulating the combined signal to a nominal value using a locked loop.

26. The method of claim 24, comprising the steps of:
controlling a voltage-controlled oscillator based on the combined signal; and
using the output signal of the oscillator as a control signal for the switch.

27. The method of claim 26, comprising a step of adjusting a predetermined duty cycle of the output signal of the oscillator.

28. The method of claim 21, wherein a device to be provided with voltage is used as variable load.

29. The method of claim 24, wherein one or more of the quantities for the formation of the combined signal are acquired from a target value comparison of the original signal selected from the group consisting of output voltage, input voltage, and phase shift with a respective target value.

* * * * *